(12) United States Patent
Tang

(10) Patent No.: US 11,212,824 B2
(45) Date of Patent: Dec. 28, 2021

(54) METHOD FOR TRANSMITTING DATA WITH TERMINAL DEVICE IN INACTIVE STATE AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 303 days.

(21) Appl. No.: 16/306,992

(22) PCT Filed: Jul. 20, 2016

(86) PCT No.: PCT/CN2016/090702
§ 371 (c)(1),
(2) Date: Dec. 4, 2018

(87) PCT Pub. No.: WO2018/014259
PCT Pub. Date: Jan. 25, 2018

(65) Prior Publication Data
US 2020/0314879 A1    Oct. 1, 2020

(51) Int. Cl.
*H04B 17/382*    (2015.01)
*H04W 72/12*    (2009.01)
(Continued)

(52) U.S. Cl.
CPC ...... *H04W 72/1273* (2013.01); *H04B 17/382* (2015.01); *H04L 5/0094* (2013.01);
(Continued)

(58) Field of Classification Search
CPC ............ H04B 17/382; H04W 28/0226; H04W 36/00837; H04W 72/00; H04W 72/1278
See application file for complete search history.

(56) References Cited

U.S. PATENT DOCUMENTS 9,301,322 B2    3/2016    Huang et al.
9,319,199 B2    4/2016    Guan
(Continued)

FOREIGN PATENT DOCUMENTS

CN    101965037 A    2/2011
CN    101984684 A    3/2011
(Continued)

OTHER PUBLICATIONS

Supplementary European Search Report in the European application No. 16909187.3, dated Jun. 12, 2019.
(Continued)

*Primary Examiner* — Salvador E Rivas

(57) ABSTRACT

Provided in the embodiments of the present application are a method for transmitting data, an access network device, a terminal device, and a network entity. The method comprises: a first access network device sends a physical downlink control channel to a terminal device, the physical downlink control channel comprising scheduling information of downlink data of the terminal device, the first access network device being any network access device in a first access network device set, the access network set comprising at least one access network device, the terminal device being able to move without switching within the range covered by the at least one access network device; and the first access network device sends the downlink data to the terminal device. In the embodiments of the present application, the terminal device is capable of receiving downlink data without recovering a high-level signalling connection, thereby improving system efficiency and reducing the power consumption of the terminal device.

20 Claims, 7 Drawing Sheets

300

A terminal device receives a PDCCH sent by a first access network device, wherein the PDCCH carries scheduling information of downlink data of the terminal device, the first access network device belongs to a set of access network devices, the set of access network devices includes at least one access network device and the terminal device is capable of moving without performing handover in coverage of the at least one access network device    — S310

The terminal device receives the downlink data sent by the first access network device according to the scheduling information    — S320

(51) Int. Cl.
    *H04W 76/11* (2018.01)
    *H04W 36/00* (2009.01)
    *H04L 5/00* (2006.01)
    *H04W 72/04* (2009.01)
    *H04W 72/00* (2009.01)
    *H04W 48/12* (2009.01)

(52) U.S. Cl.
    CPC ..... *H04W 36/00837* (2018.08); *H04W 48/12* (2013.01); *H04W 72/00* (2013.01); *H04W 72/0446* (2013.01); *H04W 72/0453* (2013.01); *H04W 72/1257* (2013.01); *H04W 76/11* (2018.02); *H04W 72/1278* (2013.01)

(56) References Cited

U.S. PATENT DOCUMENTS

| | | | | |
|---|---|---|---|---|
| 2009/0312019 | A1* | 12/2009 | Chen | H04W 36/04 455/435.2 |
| 2012/0281566 | A1 | 11/2012 | Pelletier | |
| 2012/0307777 | A1 | 12/2012 | Pan | |
| 2013/0308613 | A1* | 11/2013 | Huang | H04W 74/0833 370/336 |
| 2014/0233538 | A1* | 8/2014 | Zhang | H04W 72/1205 370/336 |
| 2014/0321382 | A1 | 10/2014 | Guan | |
| 2016/0135247 | A1* | 5/2016 | Ozturk | H04W 52/0212 455/436 |
| 2017/0231029 | A1 | 8/2017 | Pelletier et al. | |
| 2018/0206288 | A1* | 7/2018 | Pelletier | H04W 76/27 |

FOREIGN PATENT DOCUMENTS

| | | | |
|---|---|---|---|
| CN | 102083229 | A | 6/2011 |
| CN | 102300331 | A | 12/2011 |
| CN | 102595633 | A | 7/2012 |
| CN | 103179672 | A | 6/2013 |
| CN | 102300331 | B | 11/2013 |
| CN | 103580778 | A | 2/2014 |
| CN | 103634882 | A | 3/2014 |
| CN | 102595633 | B | 10/2014 |
| EP | 2536203 | A1 | 12/2012 |
| EP | 2747508 | A1 | 6/2014 |
| JP | 2016513929 | A | 5/2016 |
| WO | 2015143695 | A1 | 10/2015 |
| WO | 2016077229 | A1 | 5/2016 |

OTHER PUBLICATIONS

English translation of the Written Opinion of the International Search Authority in the international application No. PCT/CN2016/090702, dated Apr. 26, 2017.
Ronny Yongho Kim et al: "Advanced Power Management Techniques in Next-Generation Wireless Networks", Published in IEEE Communications Magazine, vol. 48, Issue 5, May 2010; pp. 94-102.
Ericsson: "Solution for Infrequent Small Data", SA WG2 Meeting #116, Jul. 11-15, 2016, Vienna, Austria; S2-164007, 8 pages.
"3rd Generation Partnership Project; Technical Specification Group Services and System Aspects; Study on Architecture for Next Generation System (Release 14)" 3GPP TR 23.799 V0.5.0 (May 2016) 178 pages.
Ericsson: "Handling of inactive UEs", 3GPP TSG-RAN WG2 #94 Nanjing, P.R. China, May 23-27, 2016, 6 pages.
First Office Action of the Japanese application No. 2018-567122, dated Apr. 28, 2020.
Office Action of the Indian application No. 201917002800, dated Jul. 10, 2020.
First Office Action of the Chinese application No. 201680086867.0, dated Jul. 16, 2020.
International Search Report in international application No. PCT/CN2016/090702, dated Apr. 26, 2017.
Written Opinion of the International Search Authority in international application No. PCT/CN2016/090702, dated Apr. 26, 2017.
"3rd Generation Partnership Project; Technical Specification Group Services and System Aspects; Study on architecture enhancements for Cellular Internet of Things (Release 13)", 3GPP Standard; Technical Report; 3GPP TR23.720, 3rd Generation Partnership Project(3GPP), Mobile Competence Centre; 650, Route Des Lucioles ; F-06921 Sophia-Antipolis Cedex; France, vol. SA WG2, No. V13.0.0, Mar. 15, 2016 (Mar. 15, 2016), pp. 1-97, XP051295071,[ retrieved on Mar. 15, 2016]* sections 6.3.1.2-6.3.1.3 and 6.16.1.3-6.16.1.4 *.
European Search Report in the European application No. 20187156.3, dated Sep. 28, 2020.
"3rd Generation Partnership Project; Technical Specification Group Radio Access Network; Universal Terrestrial Radio Access Network (UTRAN); General description; Stage 2 (Release 13)" 3GPP TS 25.300 V13.1.0 (Mar. 2016), http://www.3gpp.org.
"3rd Generation Partnership Project; Technical Specification Group Radio Access Network; Evolved Universal Terrestrial Radio Access (E-UTRA); User Equipment (UE) procedures in idle mode (Release 13)" 3GPP TS 36.304 V13.0.0 (Dec. 2015), http://www.3gpp.org.
3GPP TSG-RAN2 Meeting #93bis R2-162194, Dubrovnik, Croatia, Apr. 11-15, 2016; Agenda Item: 8.9.1; Source: OPPO; "Discussion on Paging Signaling Reduction for Light Connection", 2 pages.
3GPP TS 36.300 V13.4.0 (Jun. 2016), 3rd Generation Partnership Project; Technical Specification Group Radio Access Network; "Evolved Universal Terrestrial Radio Access (E-UTRA) and Evolved Universal Terrestrial Radio Access Network (E-UTRAN); Overall description; Stage 2.",308 pages.
3GPP TS 23.401 V13.7.0 (Jun. 2016), 3rd Generation Partnership Project; Technical Specification Group Services and System Aspects; "General Packet Radio Service (GPRS) enhancements for Evolved Universal Terrestrial Radio Access Network (E-UTRAN) access (Release 13)", 368 pages.
3GPP TSG-RAN2 Meeting #94 R2-164129, Nanjing, China, May 23-27, 2016; Source: Huawei, HiSilicon; "UE mobility tracking in "active state" and in "power saving" state", 6 pages.
3GPP TS 36.304 V13.2.0 (Jun. 2016), 3rd Generation Partnership Project; Technical Specification Group Radio Access Network; Evolved Universal Terrestrial Radio Access (E-UTRA); "User Equipment (UE) procedures in idle mode (Release 13)", 45 pages.
3GPP TSG-RAN WG2 Meeting #94 R2-163888, Nanjing, China, May 23-27, 2016; Agenda item: 8.9.1; Source: Nokia, Alcatel-Lucent Shanghai Bell; "Paging for light connection" 6 pages.
3GPP TS 36.413 V13.3.0 (Jun. 2016), 3rd Generation Partnership Project; Technical Specification Group Radio Access Network; Evolved Universal Terrestrial Radio Access Network (E-UTRAN); "S1 Application Protocol (S1AP) (Release 13).", 331 pages.
3GPP TS 36.331 V13.2.0 (Jun. 2016), 3rd Generation Partnership Project; Technical Specification Group Radio Access Network; "Evolved Universal Terrestrial Radio Access (E-UTRA); Radio Resource Control (RRC); Protocol specification (Release 13)", 613 pages.
3GPP TS 36.321 V13.2.0 (Jun. 2016), 3rd Generation Partnership Project; Technical Specification Group Radio Access Network; "Evolved Universal Terrestrial Radio Access (E-UTRA); Medium Access Control (MAC) protocol specification (Release 13)", 90 pages.
3GPP TS 24.301 V13.6.1 (Jun. 2016), 3rd Generation Partnership Project; Technical Specification Group Core Network and Terminals; "Non-Access-Stratum (NAS) protocol for Evolved Packet System (EPS); Stage 3 (Release 13)", 438 pages.
Notice of Opposition of the European application No. 16909187.3, dated Jun. 18, 2021.
First Office Action of the Taiwanese application No. 106123095, dated Mar. 19, 2021.

* cited by examiner

200

```
A first access network device sends a PDCCH to a
terminal device, the PDCCH carrying scheduling
information of downlink data of the terminal device,
wherein the first access network device is any access
network device in a set of access network devices, the     S210
set of access network devices includes at least one access
network device and the terminal device is capable of
moving without performing handover in coverage of the
at least one access network device
```

```
The first access network device sends the downlink data    S220
            to the terminal device
```

FIG. 3

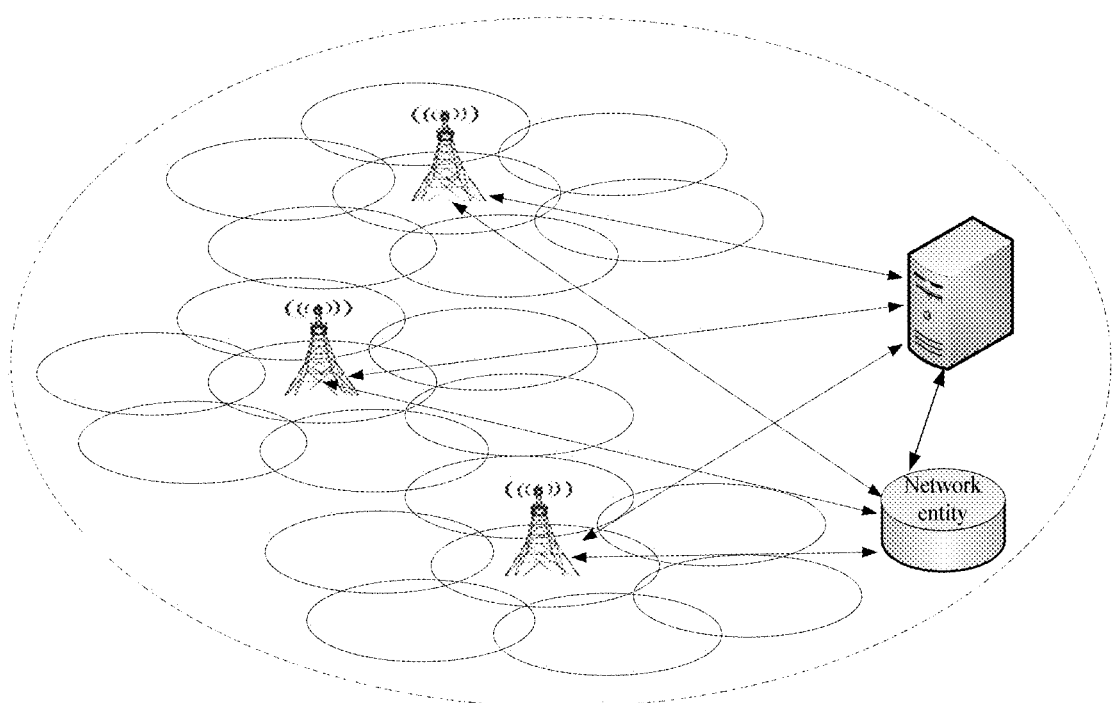

METHOD FOR TRANSMITTING DATA WITH TERMINAL DEVICE IN INACTIVE STATE AND TERMINAL DEVICE

TECHNICAL FIELD

The disclosure relates to the field of communications, and more particularly to a method for transmitting data, an access network device, a terminal device and a network entity.

BACKGROUND

In a Universal Mobile Telecommunications System (UMTS), user equipment (UE) has two basic operating modes: one is an idle mode, i.e., so-called standby state; and the other is a connected mode, and in this mode, there is a Radio Resource Control (RRC) connection between the UE and an evolved Universal Terrestrial Radio Access Network (UTRAN).

When the operating mode is the idle mode, the UE is required to receive or send data and may transmit the data only after being switched to the connected mode in which a high-layer signaling connection is established. This results in relatively low system efficiency and relatively high power consumption of the terminal device.

SUMMARY

The embodiments of the disclosure provide a method for transmitting data, which may improve system efficiency and reduce power consumption of a terminal device.

According to a first aspect, the disclosure provides a method for transmitting data, which may include the following operations. A first access network device sends a Physical Downlink Control Channel (PDCCH) to a terminal device. The PDCCH carries scheduling information of downlink data of the terminal device, the first access network device is any access network device in a set of access network devices, the set of access network devices includes at least one access network device and the terminal device is capable of moving without performing handover in coverage of the at least one access network device. The first access network device sends the downlink data to the terminal device.

Each access network device in the set of access network devices sends the PDCCH carrying the scheduling information of the downlink data of the terminal device to the terminal device, wherein the set of access network devices includes the at least one access network device, the terminal device can move without performing handover in the coverage of the at least one access network device, and the first access network device sends the downlink data to the terminal device, such that the terminal device may receive the downlink data without recovering a high-layer signaling connection. Therefore, system efficiency is improved, and power consumption of the terminal device is reduced.

In some possible implementation modes, before the operation that the first access network device sends the downlink data to the terminal device, the method may further include that: the first access network device receives the downlink data sent by a network entity.

The set of access network devices includes at least one access network device and the set of access network devices may be managed through a logical entity (represented as the network entity). For example, the network entity may know the number of the access network devices in the set of access network devices, configuration, storage and the like of terminal context information, connection of a user bearer between the access network device and a Core Network (CN) device and the like.

In some possible implementation modes, the network entity may be a CN device.

When the network entity is a CN device and there is downlink data required to be sent, a network side (for example, a server) may directly send the downlink data to the CN device, and the CN device forwards it to each access network device in the set of access network devices. When no direct connection exists between the CN device and the access network device, the CN device may establish a connection with the access network device at first.

In some possible implementation modes, the network entity may be a second access network device in the set of access network devices.

The second access network device may send the downlink data to all the access network devices, except the second access network device, in the first set of access network devices, and thus the access network devices in the set of access network devices may simultaneously send the downlink data. Alternatively, the second access network device sends the downlink data to a network covered by itself, and when a feedback of the terminal device is not received (for example, uplink data sent by the terminal device is not received), the second access network device sends the downlink data to another access network device.

In some possible implementation modes, the method may further include that the following operations. The first access network device receives resource configuration information sent by the network entity, wherein the resource configuration information is configured for the terminal device to send uplink data. The first access network device sends the resource configuration information to the terminal device.

The first access network device receives the resource configuration information for the uplink data of the terminal device from the network entity and sends the resource configuration information to the terminal device. The terminal device may send the uplink data to the first access network device according to the resource configuration information. In such a manner, the terminal device may send the uplink data without recovering the high-layer signaling connection. Therefore, the power consumption of the terminal device is reduced.

In some possible implementation modes, the operation that the first access network device sends the resource configuration information to the terminal device may include that: the first access network device sends the resource configuration information to the terminal device through the downlink data or the PDCCH.

The first access network device receives the resource configuration information for the uplink data of the terminal device from the network entity and carries the resource configuration information in the downlink data sent to the terminal device. The terminal device may send the uplink data to the first access network device according to the resource configuration information. In an alternative example, the resource configuration information for the uplink data of the terminal device may also be carried in the PDCCH. Therefore, the power consumption of the terminal device is reduced.

In some possible implementation modes, the method may further include the following operations. The first access network device receives the uplink data sent by the terminal device. The first access network device sends first indication information to other access network devices in the set of access network devices, wherein the first indication information is configured to indicate to stop sending the downlink data to the terminal device.

The terminal device, after receiving the resource configuration information for the uplink data, sends the uplink data to the first access network device. When the first access network device does not receive any feedback of the terminal device, it is indicated that the terminal device is outside coverage of the first access network device. When the first access network device receives the uplink data sent by the terminal device, it may be determined that the terminal device is presently within the coverage of the first access network device and the first access network device may send to the other access network device in the set of access network devices indication information (represented as the first indication information) that is configured to indicate the second access network device to stop sending the downlink data to the terminal device. Therefore, system power consumption is reduced.

In some possible implementation modes, the method may further include that: the first access network device receives the uplink data sent by the terminal device; and the first access network device sends second indication information to the network entity. The second indication information is configured to indicate the network entity only to send subsequent downlink data to the first access network device, and the downlink data sent to the terminal device is from or passes through the network entity.

The first access network device, responsive to determining that the terminal device is in its coverage, may send indication information (represented as the second indication information) to the network entity, and the network entity may only send the downlink data to the first access network device. Therefore, the system power consumption is reduced.

In some possible implementation modes, the resource configuration information may include at least one of a dedicated resource or an access sequence for the uplink data.

The first access network device may carry the dedicated resource for the uplink data in the downlink data or the PDCCH, or the first access network device may carry a specific access sequence for random access of the uplink data in the downlink data or the PDCCH. In such a manner, the terminal device may send the uplink data without recovering the high-layer signaling connection. Therefore, the power consumption of the terminal device is reduced.

In some possible implementation modes, before the operation that the first access network device sends the PDCCH to the terminal device, the method may further include the following operations. The first access network device determines characteristic information of the PDCCH and the first access network device sends the characteristic information to the terminal device. The characteristic information is configured to indicate the terminal device to receive the PDCCH.

When characteristic information of the PDCCH of each access network device in the set of access network devices is same, the characteristic information may be configured and sent to the terminal device by the access network devices and the characteristic information may be transmitted among network nodes as context information.

In some possible implementation modes, the characteristic information may be configured when a high-layer signaling connection exists between the first access network device and the terminal device.

The characteristic information may be configured and sent to the terminal device when the access network device establishes the high-layer signaling connection with the terminal device or recovers the high-layer signaling connection and the characteristic information may be transmitted among network nodes as the context information.

In some possible implementation modes, before the operation that the first access network device sends the PDCCH to the terminal device, the method may further include the following operations. The first access network device receives characteristic information of the PDCCH from the network entity. The first access network device sends the characteristic information to the terminal device, wherein the characteristic information is configured to indicate the terminal device to receive the PDCCH.

The first access network device receives the characteristic information of the PDCCH from the network entity and sends the characteristic information to the terminal device. The terminal device receives the PDCCH according to the characteristic information.

In some possible implementation modes, the characteristic information may be configured by the network entity.

The network entity configures the characteristic information of the PDCCH for the terminal device and sends it to the terminal device. The terminal device may accurately receive the PDCCH according to the characteristic information.

In some possible implementation modes, the operation that the first access network device sends the characteristic information to the terminal device may include that: the first access network device sends the characteristic information to the terminal device through system information.

When the characteristic information of the PDCCH of each access network device in the set of access network devices is different, each access network device may carry respective characteristic information in system information and send the system information to the terminal device to send the characteristic information of the access network device, so as to enable the terminal device to receive the PDCCH.

In some possible implementation modes, the characteristic information may include at least one of time-domain resource information, frequency-domain resource information, subcarrier spacing information or subframe structure information.

The first access network device sends the PDCCH through a preset time-domain location (i.e., periodically) and the terminal device is required to receive the PDCCH in a Discontinuous Reception (DRX) manner. The first access network device sends the PDCCH through other characteristic information, and the terminal device is required to accurately receive the PDCCH according to the corresponding characteristic information.

In some possible implementation modes, the scheduling information may be scheduling information scrambled through a Radio Network Temporary Identity (RNTI) corresponding to the terminal device. The RNTI may be the same as RNTIs with which scheduling information carried by PDCCHs of other access network devices in the set of access network devices are scrambled, the RNTI may be configured when the high-layer signaling connection exists between the first access network device and the terminal device, or the RNTI may be pre-configured and sent to each access network device in the set of access network devices by the network entity. Before the operation that the first access network device sends the downlink data to the terminal device, the method may further include that: the first access network device sends the RNTI to the terminal device, wherein the RNTI is configured for the terminal device to demodulate the scheduling information.

The access network device sends the RNTI to the terminal device to enable the terminal device to demodulate the received PDCCH according to the RNTI, so as to obtain the scheduling information carried in the PDCCH. The terminal device may receive the downlink data without recovering the high-layer signaling connection.

Therefore, the power consumption of the terminal device is reduced.

In some possible implementation modes, the operation that the first access network device sends the RNTI to the terminal device may include that: the first access network device sends the system information to the terminal device, wherein the system information carries the RNTI.

Each access network device in the set of access network devices may carry an RNTI in system information and broadcast the system information to the terminal device, so as to send the RNTI to the terminal device. The terminal device demodulates and obtains the scheduling information carried in the PDCCH according to the RNTI. The terminal device may receive the downlink data without recovering the high-layer signaling connection. Therefore, the power consumption of the terminal device is reduced.

In some possible implementation modes, the downlink data may be user-plane data or control-plane data.

The control-plane data may be an RRC message, for example, a paging message.

According to a second aspect, the disclosure provides a method for transmitting data, which may include the following operations. A terminal device receives a PDCCH sent by a first access network device. The PDCCH carries scheduling information of downlink data of the terminal device, the first access network device belongs to an set of access network devices, the set of access network devices includes at least one access network device and the terminal device is capable of moving without performing handover in coverage of the at least one access network device. The terminal device receives the downlink data sent by the first access network device according to the scheduling information.

The terminal device may receive the PDCCH sent by the first access network device in the set of access network devices, the set of access network devices includes at least one access network device, the terminal device may move without performing handover in the coverage of the at least one access network device, and the first access network device sends the downlink data to the terminal device, such that the terminal device may receive the downlink data in a state that a high-layer signaling connection is not recovered. Therefore, system efficiency is improved, and power consumption of the terminal device is reduced.

In some possible implementation modes, the method may further include the following operations. The terminal device receives resource configuration information sent by the first access network device, wherein the resource configuration information is configured for the terminal device to send uplink data. The terminal device sends the uplink data to the first access network device according to the resource configuration information.

The terminal device receives the resource configuration information for the uplink data from the first access network device and may send the uplink data to the first access network device according to the resource configuration information. In such a manner, the terminal device may send the uplink data without recovering the high-layer signaling connection. Therefore, the power consumption of the terminal device is reduced.

In some possible implementation modes, the operation that the terminal device receives the resource configuration information sent by the first access network device may include that: the terminal device receives the resource configuration information carried in the downlink data or the PDCCH.

The terminal device may receive the downlink data or the PDCCH to receive the resource configuration information. That is, the resource configuration information may be carried in the downlink data or the PDCCH. In such a manner, the terminal device may send the uplink data without independently sending the resource configuration information as well as recovering the high-layer signaling connection.

Therefore, the power consumption of the terminal device is further reduced.

In some possible implementation modes, the resource configuration information may include at least one of a dedicated resource or an access sequence for the uplink data.

The terminal device may receive the dedicated resource, carried in the downlink data or the PDCCH, for the uplink data from the first access network device, or the first access network device carries a specific access sequence for uplink data random access to the uplink data in the downlink data or the PDCCH. In such a manner, the terminal device may send the uplink data without recovering the high-layer signaling connection. Therefore, the power consumption of the terminal device is reduced.

In some possible implementation modes, before the operation that the downlink data sent by the first access network device is received, the method may further include the following operations. The terminal device receives an RNTI sent by the first access network device, and the terminal device demodulates the scheduling information according to the RNTI.

The terminal device receives the RNTI sent by the access network device and demodulates the received PDCCH according to the RNTI to obtain the scheduling information carried in the PDCCH. The terminal device may receive the downlink data in the state that the high-layer signaling connection is not recovered. Therefore, the power consumption of the terminal device is reduced.

In some possible implementation modes, the operation that the terminal device receives the RNTI sent by the first access network device may include that: the terminal device receives system information sent by the first access network device, wherein the system information carries the RNTI.

The terminal device may receive the RNTI in the system information and demodulate and obtain the scheduling information carried in the PDCCH according to the RNTI. The terminal device may receive the downlink data without recovering the high-layer signaling connection. Therefore, the power consumption of the terminal device is reduced.

In some possible implementation modes, the method may further include that: the terminal device receives characteristic information of the first access network device. The operation that the terminal device receives the PDCCH sent by the first access network device may include that: the terminal device receives the PDCCH sent by the first access network device according to the characteristic information.

The terminal device receives the characteristic information of the PDCCH from the first access network device and may accurately receive the PDCCH according to the characteristic information. Therefore, system efficiency is improved.

In some possible implementation modes, the operation that the terminal device receives the characteristic information of the first access network device may include that: the terminal device receives system information sent by the first access network device. The system information may carry the characteristic information of the first access network device.

The terminal device receives the system information sent by the first access network device, and the system information carries the characteristic information of the first access network device. Therefore, the terminal device may accurately receive the PDCCH according to the characteristic information.

In some possible implementation modes, the characteristic information may include at least one of time-domain resource information, frequency-domain resource information, subcarrier spacing information or subframe structure information.

The first access network device sends the PDCCH through a preset time-domain location (i.e., periodically) and the terminal device is required to receive the PDCCH in a Discontinuous Reception (DRX) manner. The first access network device sends the PDCCH through other characteristic information and the terminal device accurately receives the PDCCH according to the received corresponding characteristic information.

In some possible implementation modes, the downlink data may be user-plane data or control-plane data.

The control-plane data may be an RRC message, such as, a paging message.

According to a third aspect, the disclosure provides a method for transmitting data, which may include the following operations. A network entity determines a set of access network devices. The network entity sends downlink data to an access network device in the set of access network devices. The set of access network devices includes at least one access network device and terminal device is capable of moving without performing handover in coverage of the at least one access network device.

The set of access network devices includes at least one access network device and the set of access network devices may be managed through a logical entity (represented as the network entity). For example, the network entity may know the number of the access network devices in the set of access network devices, configuration, storage and the like of terminal context information, connection of a user bearer between the access network device and a Core Network (CN) and the like. A network side may send the downlink data to the network entity, and the network entity forwards it to each access network device in the set of access network devices. Each access network device in the set of access network devices sends the downlink data to the terminal device, such that the terminal device may receive the downlink data without recovering a high-layer signaling connection. Therefore, system efficiency is improved and power consumption of the terminal device is reduced.

In some possible implementation modes, the network entity may be a CN device. The operation that the network entity sends the downlink data to the access network device in the set of access network devices may include that: the CN device sends the downlink data to each of the at least one access network device.

When the network entity is a CN device and there is downlink data required to be sent, a network side (for example, a server) may directly send the downlink data to the CN device, and the CN device forwards it to each access network device in the set of access network devices. When no direct connection exists between the CN and the access network device, the CN may establish a connection with the access network device firstly and then sends the downlink data to the terminal device through each access network device in the set of access network devices to enable the terminal device to receive the downlink data without recovering the high-layer signaling connection. Therefore, the system efficiency is improved and the power consumption of the terminal device is reduced.

In some possible implementation modes, the network entity may be a second access network device in the set of access network devices. The operation that the network entity sends the downlink data to the access network device in the set of access network devices may include that: the second access network device sends the downlink data to all the access network devices, except the second access network device, in the set of access network devices.

The second access network device may send the downlink data to all the access network devices, except the second access network device, in the first set of access network devices and then the other access network devices in the set of access network devices may simultaneously send the downlink data to the terminal device to enable the terminal device to receive the downlink data without recovering the high-layer signaling connection. Therefore, the system efficiency is improved and the power consumption of the terminal device is reduced.

In some possible implementation modes, the method may further include that: the second access network device sends the downlink data to the terminal device.

The second access network device may also send the downlink data to a network covered by itself. That is, all the access network devices in the set of access network devices may simultaneously send the downlink data to the terminal device, such that the terminal device may receive the downlink data in the state that the high-layer signaling connection is not recovered. Therefore, the system efficiency is improved and the power consumption of the terminal device is reduced.

In some possible implementation modes, the method may further include the following operations. The network entity receives indication information sent by a first access network device in the access network device, wherein the indication information is configured to indicate the network entity only to send subsequent downlink data to the second access network device. The network entity only sends the subsequent downlink data to the first access network device.

The network entity may receive the indication information sent by the first access network device responsive to determining that the terminal device belongs to the first access network device, and the network entity may only send the downlink data to the first access network device. Therefore, system power consumption is reduced.

In some possible implementation modes, the method may further include that: the network entity sends resource configuration information to the terminal device through the access network device in the set of access network devices. The resource configuration information is configured for the terminal device to send uplink data.

The network entity may send the resource configuration information for the uplink data to the terminal device through the access network device in the set of access network devices, to enable the terminal device to send the uplink data to the access network device according to the resource configuration information. In such a manner, the terminal device may send the uplink data without recovering the high-layer connection. Therefore, the power consumption of the terminal device is reduced.

In some possible implementation modes, the resource configuration information may include at least one of a dedicated resource or an access sequence for the uplink data.

In some possible implementation modes, the method may further include that: the network entity sends characteristic information of the PDCCH to the terminal device through the access network device in the set of access network devices. The characteristic information is configured to indicate the terminal device to receive the PDCCH.

The network entity may configure the characteristic information for the PDCCH and send it to the terminal device through the access network device in the set of access network devices. The characteristic information may be transmitted among network nodes as context information.

In some possible implementation modes, the characteristic information may include at least one of time-domain resource information, frequency-domain resource information, subcarrier spacing information or subframe structure information.

In some possible implementation modes, the downlink data may be user-plane data or control-plane data.

The control-plane data may be an RRC message, for example, a paging message.

According to a fourth aspect, the disclosure provides an access network device. The access network device includes modules configured to execute the method in the first aspect or any possible implementation mode of the first aspect.

According to a fifth aspect, the disclosure provides a terminal device. The terminal device includes modules configured to execute the method in the second aspect or any possible implementation mode of the second aspect.

According to a sixth aspect, the disclosure provides a network entity. The network entity includes modules configured to execute the method in the third aspect or any possible implementation mode of the third aspect.

According to a seventh aspect, the disclosure provides a data transmission system. The data transmission system includes the access network device of the fourth aspect, the terminal device of the fifth aspect and the network entity of the sixth aspect.

According to an eighth aspect, the disclosure provides an access network device, which includes a processor and a memory.

The memory stores a program. The processor executes the program to execute the method for transmitting data in the first aspect or any possible implementation mode of the first aspect.

According to a ninth aspect, the disclosure provides terminal device, which includes a processor and a memory.

The memory stores a program. The processor executes the program to execute the method for transmitting data in the second aspect or any possible implementation mode of the second aspect.

According to a tenth aspect, the disclosure provides a network entity, which includes a processor and a memory.

The memory stores a program. The processor executes the program to execute the method for transmitting data in the third aspect or any possible implementation mode of the third aspect.

According to an eleventh aspect, the disclosure provides a computer storage medium, in which a program code is stored. The program code may be configured to indicate the method for transmitting data in the first aspect or any possible implementation mode of the first aspect to be executed.

According to a twelfth aspect, the disclosure provides a computer storage medium, in which a program code is stored. The program code may be configured to indicate the method for transmitting data in the second aspect or any possible implementation mode of the second aspect to be executed.

According to a thirteenth aspect, the disclosure provides a computer storage medium, in which a program code is stored. The program code may be configured to indicate the method for transmitting data in the third aspect or any possible implementation mode of the third aspect to be executed.

On the basis of the technical solutions, according to the method for transmitting data in the embodiments of the disclosure, each access network device in the set of access network devices sends to the terminal device the PDCCH carrying the scheduling information of the downlink data of the terminal device, the set of access network devices includes at least one access network device, the terminal device may move without handover in the coverage of the at least one access network device, each access network device sends the downlink data to the terminal device, such that the terminal device may receive the downlink data without recovering a high-layer signaling connection. Therefore, the system efficiency is improved, and the power consumption of the terminal device is reduced.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

FIG. 3 is a schematic diagram of a method for transmitting data according to an embodiment of the disclosure.

FIG. 4 is a schematic diagram of a method for transmitting data according to another embodiment of the disclosure.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

Embodiments of a terminal device and an access network device are combined in the disclosure. The terminal device may also be called an access terminal, UE, a user unit, a user station, a mobile radio station, a mobile station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device and a terminal device in a future 5th-Generation (5G) network.

The access network device may be configured to communicate with a mobile device. The access network device may be a Base Transceiver Station (BTS) in a Global System of Mobile communication (GSM) or Code Division Multiple Access (CDMA), may also be a NodeB (NB) in Wideband Code Division Multiple Access (WCDMA) and may further be an Evolutional Node B (eNB or eNodeB) in Long Term Evolution (LTE), or a relay station or access point, or a vehicle-mounted device, a wearable device and an access network device in the future 5G network.

A CN device may be a Mobility Management Entity (MME) and may also be a Serving Gateway (S-GW) or a Packet Data Network Gateway (P-GW). There are no limits made in the disclosure.

For making the embodiments of the disclosure convenient to understand, the following elements will be introduced before the embodiments of the disclosure are introduced herein.

There is only one idle state in an idle mode. In the idle state, all connections of UE are disabled in an access stratum. No context is established for UE in the idle mode in an UTRAN. Specific UE may be addressed only by sending paging messages to all UE or multiple UEs monitoring the same paging time period in a cell.

There are four states in a connected mode: CELL-PCH (cell paging channel state), URA-PCH (UTRAN registration area paging channel state), CELL-FACH (cell forward access channel state) and CELL-DCH (cell dedicated channel state). CELL-DCH is a connected mode of a high-layer signaling connection and may also be called an "active state".

Figure 1:
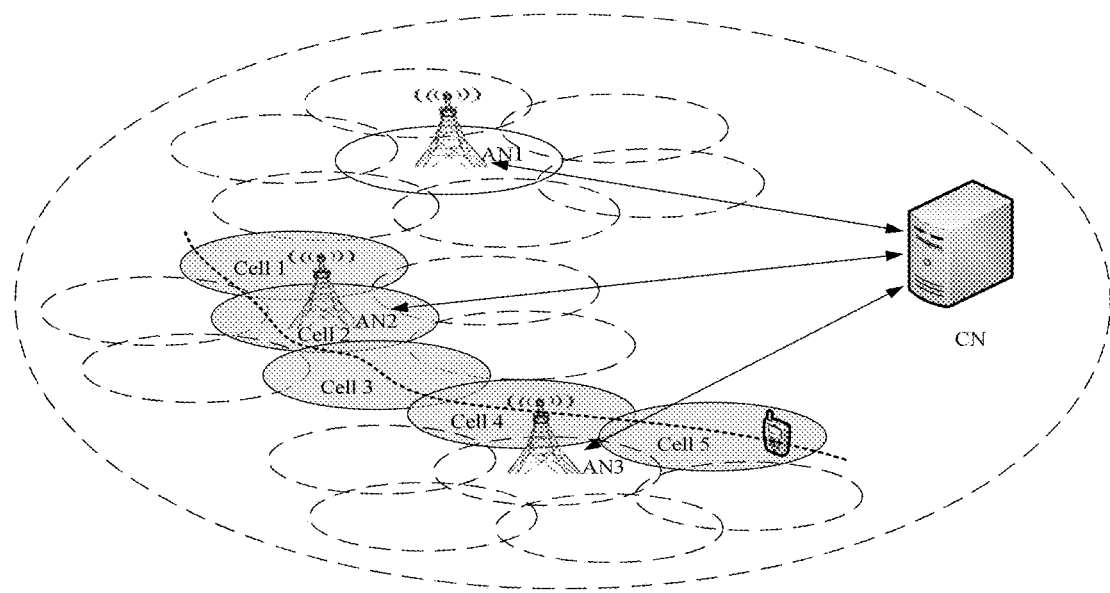
FIG. 1 is a diagram of an application scenario according to an embodiment of the disclosure.

FIG. 1 is a schematic diagram of an application scenario according to the disclosure. In FIG. 1, when a terminal device resides in a cell 2 of an access network device 2 (AN2) and the terminal device initiates a service connection request, the AN2 establishes a connection with a CN device (CN). The AN2 simultaneously transmits configured context information to the CN and the CN determines a set of access network devices according to stored historical access information of the terminal device. When determining that an AN3 belongs to the set of access network devices, the CN establishes a network connection with the AN3 and sends the context information of the terminal device to the AN3. The AN3 communicates with a network according to the context information. In such a manner, the terminal device may seamlessly move between a cell covered by the AN3 and the cell covered by the AN2. That is, the terminal device may move in coverage of the access network devices in the set of access network devices without performing handover of the access network devices, i.e., without notifying the network.

Figure 2:
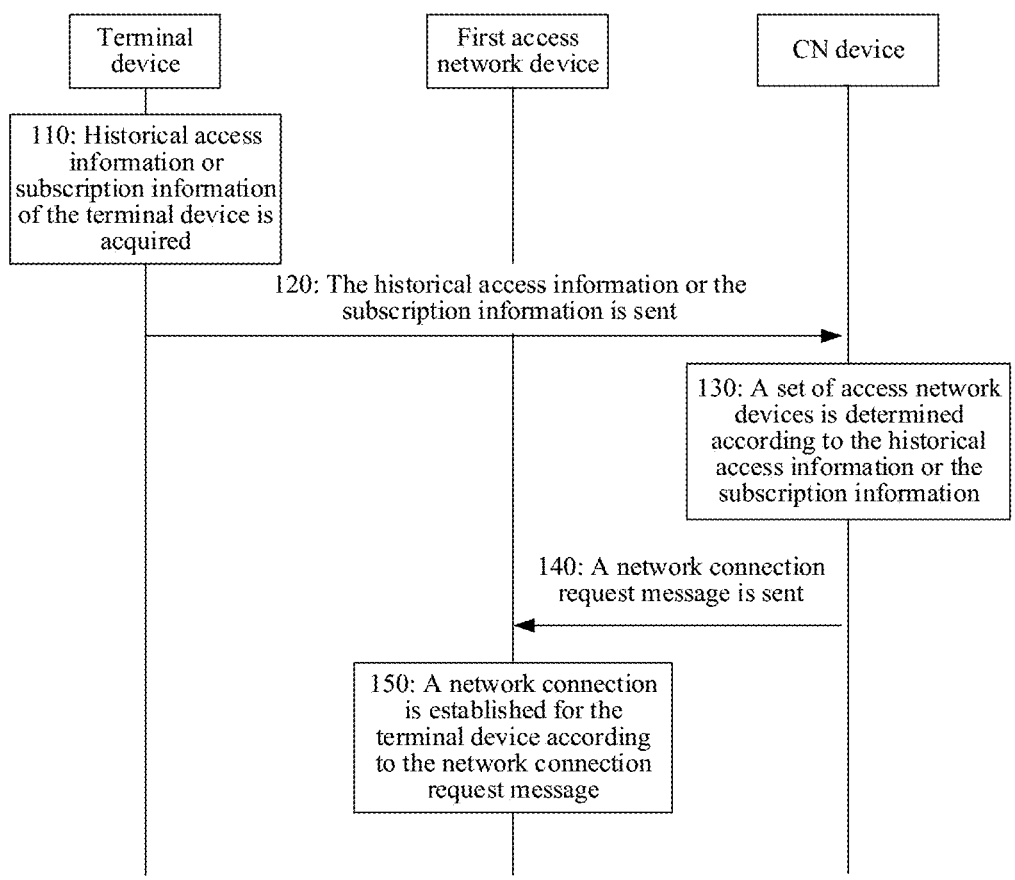
FIG. 2 is a schematic flowchart of a communication method in an application scenario according to an embodiment of the disclosure.

FIG. 2 is an interaction flowchart of a communication method in an application scenario according to the disclosure.

In 110, a terminal device acquires historical access information or subscription information of the terminal device.

In 120, the terminal device sends the historical access information or the subscription information to a CN device.

The terminal device may directly send the historical access information to the CN device. For example, the terminal device, when sending a Non-Access Stratum (NAS) signaling request message to the CN device, carries the historical access information in the signaling request message. Alternatively, the terminal device may send the historical access information to the CN device through forwarding of an access network device presently accessed by the terminal device.

In 130, the CN device determines a set of access network devices according to the historical access information or the subscription information.

The CN device receives the subscription information or the historical access information, determines at least one access network device that the terminal device frequently resides according to the subscription information or the historical access information and determines the at least one access network device as a virtual set of access network devices.

The CN device may determine different sets of access network devices according to different types of information (Identifiers (IDs) of access network devices, duration information and/or service type information) in the historical access information.

In 140, the CN device sends a network connection request message to each of the at least one access network device.

The CN device determines the set of access network devices (i.e., the at least one access network device) of the terminal device and sends the network connection request message to each of the at least one access network device. The network connection request message carries context information of the terminal device. The context information is configured and generated for the terminal device by the presently accessed access network device, and sent to the CN device when the terminal device initiates a service connection. Each access network device in the set of access network devices may receive and store the context information.

In 150, the access network device establishes a network connection with the terminal device according to the network connection request message.

Each of the at least one access network device receives the network connection request message and establishes the network connection with the terminal device according to the network connection request message. Alternatively, the CN device may directly establish a network connection with each access network device in the set of access network devices. There are no limits made thereto in the disclosure. In such a manner, each access network device in the set of access network devices establishes the network connection with the terminal device in advance and then the terminal device may seamlessly move in coverage of the at least one access network device. Therefore, a communication delay is reduced.

After the terminal device moves and accesses a first access network device (i.e., any access network device in the set of access network devices), the terminal device may communicate with the access network through the context information stored by the first access network device. In such a manner, the terminal device may seamlessly move in the coverage of the at least one access network device. Therefore, the communication delay is reduced.

The terminal device sends the historical access information or subscription information of the terminal device to the CN device, so as to enable the CN device to determine the set of access network devices including at least one access network device according to the historical access information or the subscription information, and sends the network connection request message to each access network device in the set of access network devices. Each access network device in the set of access network devices establishes the network connection with the terminal device according to the network connection request message. In such a manner, each access network device in the set of access network devices establishes the network connection with the terminal device in advance and then the terminal device may seamlessly move in the coverage of the at least one access network device. Therefore, the communication delay is reduced.

It is to be understood that in the embodiments of the disclosure, a state that the terminal device is capable of performing no access network device handover in the coverage of all the access network devices in at least one set of access network devices may be called an "inactive state". That is, an RRC connection and bearer of the terminal device are reserved in the coverage of all the access network devices in the set of access network devices, and actions of the terminal device in an access stratum may not be notified to the access network devices.

It is also to be understood that the name of the inactive state is not limited in the embodiments of the disclosure. For example, when there is only one access network device in the set of access network devices, it may also be called an "idle state".

In a related art, the terminal device may transmit data only after being switched from the inactive state to an active state with a high-layer signaling connection, which results in relatively low system efficiency and relatively high power consumption of the terminal device.

The application scenario of the disclosure has been described above in combination with FIG. 1 and FIG. 2 in detail. A method for transmitting data, an access network device, a terminal device and a network entity applicable to the system will be described below in detail.

FIG. 3 is a schematic diagram of a method for transmitting data 200 according to an embodiment of the disclosure. An execution body of the method 200 may be an access network device. The method 200 includes the following operations.

In S210, a first access network device sends a PDCCH to a terminal device, the PDCCH carrying scheduling information of downlink data of the terminal device, wherein the first access network device is any access network device in a set of access network devices, the set of access network devices includes at least one access network device and the terminal device is capable of moving without performing handover in coverage of the at least one access network device.

In S220, the first access network device sends the downlink data to the terminal device.

Each access network device in the set of access network devices sends to the terminal device the PDCCH carrying the scheduling information of the downlink data of the terminal device, the set of access network devices includes at least one access network device, the terminal device may move without handover in the coverage of the at least one access network device, and the first access network device sends the downlink data to the terminal device, such that the terminal device may receive the downlink data without recovering a high-layer signaling connection. Therefore, system efficiency is improved, and power consumption of the terminal device is reduced.

Each access network device in the set of access network devices sends the PDCCH to the terminal device and only one access network device may successfully send the PDCCH to the terminal device. That is, the terminal device may only receive the PDCCH sent by the first access network device to which the terminal device belongs. The first access network device sends the PDCCH to the terminal device, and the PDCCH carries the scheduling information of the downlink data of the terminal device.

It is to be noted that the first access network device is any access network device in the set of access network devices and the set of access network devices includes at least one access network device. The terminal device may freely move in the coverage of all the access network devices in the set of access network devices without performing handover of access network devices.

In an optional embodiment, before the operation that the first access network device sends the downlink data to the terminal device, the method further includes that: the first access network device receives the downlink data sent by a network entity.

The set of access network devices includes at least one access network device and the set of access network devices may be managed through a logical entity (represented as the network entity). For example, the network entity may know the number of the access network devices in the set of access network devices, configuration, storage and the like of terminal context information, connection of a user bearer between the access network device and a CN device and the like.

It is to be noted that the network entity may be a certain access network device in the set of access network devices or the CN device or another network entity outside the set of access network devices or the like. There are no limits made thereto in the disclosure. For convenient description, descriptions will be made in the embodiment of the disclosure with the condition that the network entity is an independent device as an example. However, the disclosure is not limited thereto.

When there is downlink data required to be sent, a network side (for example, a server) may send the downlink data to the network entity for the network entity to forward to each access network device in the set of access network devices. As illustrated in FIG. 4, the network entity is an independent device responsible for managing the set of access network devices. When there is downlink data required to be sent, the CN device communicates with the network entity at first, establishes a user-plane bearer between the CN device and the access network device, and transmits establishment information of the user-plane bearer and context information of the terminal device to the access network device.

In an optional embodiment, the network entity is a CN device.

Figure 5:
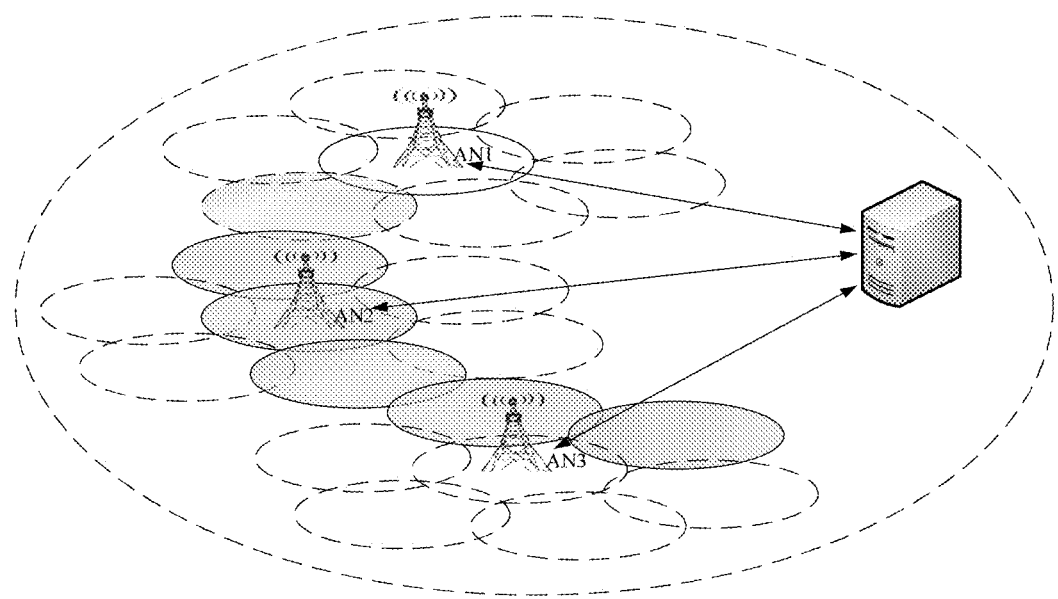
FIG. 5 is a schematic diagram of a method for transmitting data according to another embodiment of the disclosure.

When the network entity is the CN device, as illustrated in FIG. 5, when there is downlink data required to be sent, the network side (for example, the server) may directly send the downlink data to the CN device, and the CN device forwards it to each access network device in the set of access network devices. When no direct connection exists between the CN device and the access network device, the CN device may establish a connection with the access network device at first. For example, the CN device communicates with the network entity, establishes the user-plane bearer between the access network device and the CN device, and sends the establishment information of the user-plane bearer and the context information of the terminal device to the access network device. Therefore, the CN device sends the downlink data to the terminal device through the network entity.

It is to be understood that the CN device may also directly send the downlink data to each access network device in the set of access network devices. In such case, the network entity may only have a control and management function.

In an optional embodiment, the first access network device may also be an access network device presently connected with the network entity. In such case, the network entity may only send the downlink data to the first access network device and send it to the terminal device. When the first access network device does not receive a feedback of the terminal device, the first access network device sends information indicating a data transmission failure to the CN device and sends the downlink data to another access network device in the set of access network devices. When the first access network device receives downlink data from the terminal device, the network entity is not required to send the downlink data to the other access network devices in the set of access network devices. Therefore, network resources are saved.

Figure 6:
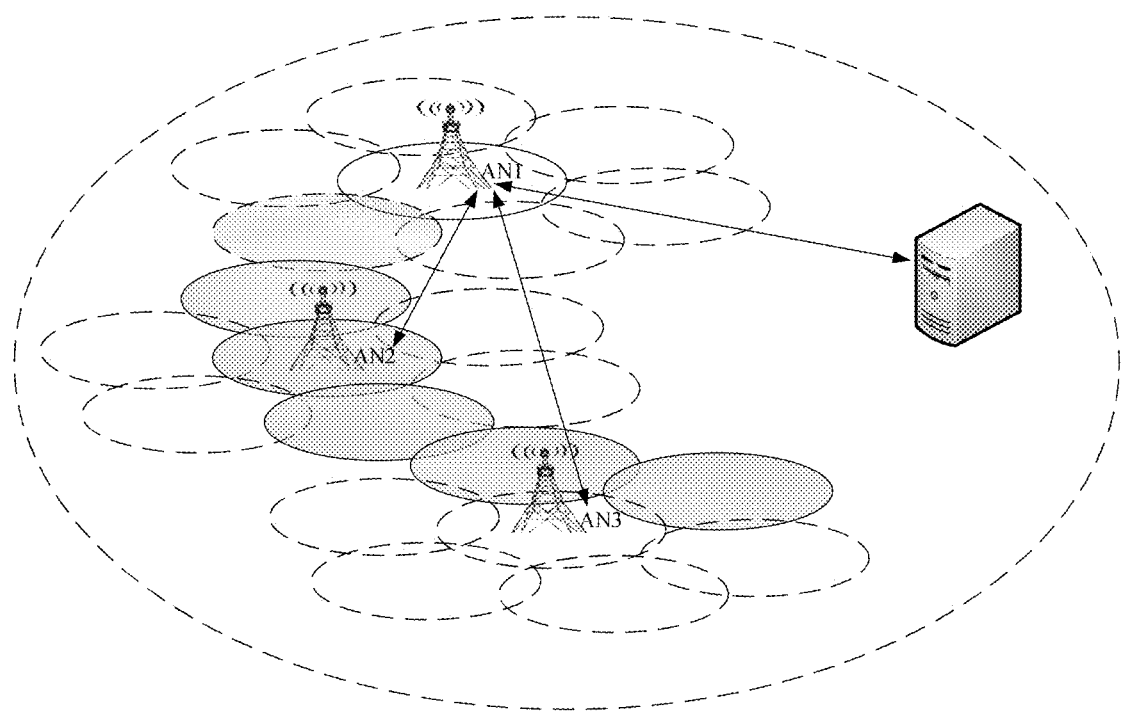
FIG. 6 is a schematic diagram of a method for transmitting data according to another embodiment of the disclosure.

In an optional embodiment, when the network entity is an access network device, as illustrated in FIG. 6, when there is downlink data required to be sent, the network side (for example, the server) may send the downlink data to the CN device, and the CN device forwards it to any access network device (represented as a second access network device), except the first access network device, in the set of access network devices.

Specifically, the second access network device may send the downlink data to all the access network devices, except the second access network device, in the first set of access network devices, and thus the access network devices in the first set of access network devices may simultaneously perform data transmission. Alternatively, the second access network device sends the downlink data to a network covered by itself. When a feedback of the terminal device is not received (for example, uplink data sent by the terminal device is not received), the second access network device sends the downlink data to another access network device. Correspondingly, the second access network device may send the downlink data to all of the other access network devices and the access network devices simultaneously send the downlink data. Alternatively, the downlink data may also be sent to only one access network device to search the terminal device one by one.

It is to be understood that, when the downlink data is transmitted, the context information of the terminal device may be carried in the downlink data. There are no limits made thereto in the disclosure.

It is also to be understood that the second access network device and the first access network device may be the same access network device and then the downlink data may be directly sent to the first access network device from the CN device and transmitted to the terminal device.

In an optional embodiment of the disclosure, before the operation that the first access network device sends the PDCCH to the terminal device, the method further includes the following operations. The first access network device determines characteristic information of the PDCCH, and the first access network device sends the characteristic information to the terminal device. The characteristic information is configured to indicate the terminal device to receive the PDCCH.

The PDCCH may have different characteristics. In an optional example, the characteristic information of the PDCCH may include at least one of time-domain resource information, frequency-domain resource information, subcarrier spacing information or subframe structure information, etc.

For example, the first access network device sends the PDCCH through a preset time-domain location (i.e., periodically) and the terminal device is required to receive the PDCCH in a DRX manner.

In an optional embodiment, the characteristic information is configured when a high-layer signaling connection exists between the first access network device and the terminal device.

Specifically, each access network device in the set of access network devices may adopt the same characteristic information (i.e., the characteristic information of each access network device in the set of access network devices is unified) and send it to the terminal device. The characteristic information may be characteristic information of the PDCCH that is configured for the terminal device when the access network device establishes the high-layer signaling connection with the terminal device (that is, the terminal device is in an active state) or recovers the high-layer signaling connection last time, or the characteristic information may also be determined in another manner. There are no limits made thereto in the disclosure. In addition, the characteristic information may be transmitted among network nodes as the context information of the terminal device.

In an optional embodiment of the disclosure, before the operation that the first access network device sends the PDCCH to the terminal device, the method further includes the following operations. The first access network device receives the characteristic information of the PDCCH from the network entity, wherein the characteristic information is configured by the network entity. The first access network device sends the characteristic information to the terminal device. The characteristic information is configured to indicate the terminal device to receive the PDCCH.

Specifically, each access network device in the set of access network devices may adopt the same characteristic information (that is, the characteristic information in the set of access network devices is unified) and send it to the terminal device. The characteristic information may be allocated by the network entity, pre-configured and transmitted to each access network device in the set of access network devices and then sent to the terminal device.

In an optional embodiment of the disclosure, the operation that the first access network device sends the characteristic information to the terminal device includes that: the first access network device sends the carried characteristic information to the terminal device through system information.

When the characteristic information of the PDCCH of each access network device in the set of access network devices is different, each access network device may carry the respective characteristic information in system information and implement transmission of the characteristic information of the access network device through sending the system information to the terminal device, so as to enable the terminal device to receive the PDCCH.

In an optional embodiment of the disclosure, the scheduling information is scheduling information scrambled with an RNTI corresponding to the terminal device.

The RNTI is the same as RNTIs with which scheduling information carried by PDCCHs of other access network devices in the set of access network devices are scrambled. The RNTI is configured when the high-layer signaling connection exists between the first access network device and the terminal device, or the RNTI is pre-configured and sent to each access network device in the set of access network devices by the network entity. Before the operation that the first access network device sends the downlink data to the terminal device, the method further includes that: the first access network device sends the RNTI to the terminal device, wherein the RNTI is configured for the terminal device to demodulate the scheduling information.

Specifically, the terminal device receives the PDCCH, and the PDCCH carries the scheduling information of the downlink data of the terminal device. The terminal device receives the downlink data according to the scheduling information. Specifically, the terminal device receives the RNTI sent by the access network device and demodulates the received PDCCH according to the RNTI to obtain the scheduling information carried in the PDCCH. Each access network device in the set of access network devices may adopt the same RNTI to scramble the scheduling information (that is, the RNTI in the set of access network devices is unified) and send it to the terminal device. The RNTI may be an RNTI configured when the access network device establishes the high-layer signaling connection (that is, the terminal device is in the active state) or recovers the high-layer signaling connection last time. There are no limits made thereto in the disclosure. In addition, the RNTI may be transmitted among the network nodes as the context information of the terminal device.

Each access network device in the set of access network devices may adopt the same RNTI to scramble the scheduling information (that is, the RNTI in the set of access network devices is unified) and send it to the terminal device. The RNTI may be allocated by the network entity, pre-configured to the access network devices in the set of access network devices and then sent to the terminal device.

In an optional embodiment, the downlink data may be user-plane data or control-plane data. Specifically, the control-plane data may be an RRC message, for example, a paging message.

In an optional embodiment of the disclosure, the scheduling information is scheduling information scrambled with the RNTI. The method further includes that: the first access network device sends system information to the terminal device, The system information carries the RNTI and the RNTI is configured for the terminal device to demodulate the scheduling information.

Specifically, the RNTI may be specified by the network and each access network device in the set of access network devices may carry the RNTI in the system information and broadcast the system information to the terminal device, so as to send the RNTI to the terminal device. For example, the system information is a paging message.

In an optional embodiment, the method further includes the following operations. The first access network device receives resource configuration information sent by the network entity, wherein the resource configuration information is configured for the terminal device to send uplink data. The first access network device sends the resource configuration information to the terminal device.

The first access network device receives the resource configuration information for the uplink data of the terminal device from the network entity and sends the resource configuration information to the terminal device. The terminal device may send the uplink data to the first access network device according to the resource configuration information. In such a manner, the terminal device may send the uplink data without recovering the high-layer signaling connection. Therefore, the power consumption of the terminal device is reduced.

In an optional embodiment, the operation that the first access network device sends the resource configuration information to the terminal device includes that: the first access network device sends the resource configuration information to the terminal device through the downlink data or the PDCCH.

Specifically, the first access network device receives the resource configuration information for the uplink data of the terminal device from the network entity and carries the resource configuration information in the downlink data sent to the terminal device. The terminal device may send the uplink data to the first access network device according to the resource configuration information. Alternatively, the resource configuration information for the uplink data of the terminal device may also be carried in the PDCCH. Therefore, the power consumption of the terminal device is reduced.

It is to be understood that the resource configuration information may be allocated and sent to the first access network device by the network entity. Alternatively, the resource configuration information may also be allocated and sent to the network entity by the access network device presently accessed by the terminal device in the set of access network devices. This configuration is stored by the network entity, and the network entity may send the resource configuration information to the other access network devices in the set of access network devices as needed.

In an optional embodiment of the disclosure, the resource configuration information includes at least one of a dedicated resource or an access sequence for the uplink data.

The first access network device may carry the dedicated resource for the uplink data in the downlink data or the PDCCH, or the first access network device may carry a specific access sequence for uplink data random access to the uplink data in the downlink data or the PDCCH. In such a manner, the terminal device may send the uplink data without recovering the high-layer signaling connection. Therefore, the power consumption of the terminal device is reduced.

In an optional embodiment, the method further includes the following operations. The first access network device receives the uplink data sent by the terminal device; and the first access network device sends first indication information to another access network device in the set of access network devices. The first indication information is configured to indicate to stop sending the downlink data to the terminal device.

The terminal device, after receiving the resource configuration information for the uplink data, sends the uplink data to the first access network device. When the first access network device does not receive any feedback of the terminal device, it is indicated that the terminal device is outside coverage of the first access network device. When the first access network device receives the uplink data sent by the terminal device, it may be determined that the terminal device is presently within the coverage of the first access network device and the access network device may send to the other access network device in the set of access network devices indication information (represented as the first indication information) that is configured to indicate the second access network device to stop sending the downlink data to the terminal device. Therefore, system power consumption is reduced.

In an optional embodiment of the disclosure, the method further includes the following operations. The first access network device receives the uplink data sent by the terminal device, and the first access network device sends second indication information to the network entity. The second indication information is configured to indicate the network entity only to send subsequent downlink data to the first access network device, and the downlink data sent to the terminal device is from or passes through the network entity.

The first access network device, responsive to determining that the terminal device is in its coverage, may send indication information (represented as the second indication information) to the network entity, and the network entity may only send the downlink data to the first access network device. Therefore, the system power consumption is reduced.

Therefore, according to the method for transmitting data of the embodiments of the disclosure, the first access network device in the set of access network devices sends to the terminal device the PDCCH carrying the scheduling information of the downlink data of the terminal device, the set of access network devices includes at least one access network device, the terminal device may move without handover in the coverage of the at least one access network device, and the first access network device sends the downlink data to the terminal device, such that the terminal device may receive the downlink data without recovering a high-layer signaling connection. Therefore, the system efficiency is improved, and the power consumption of the terminal device is reduced.

It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

Figure 7:
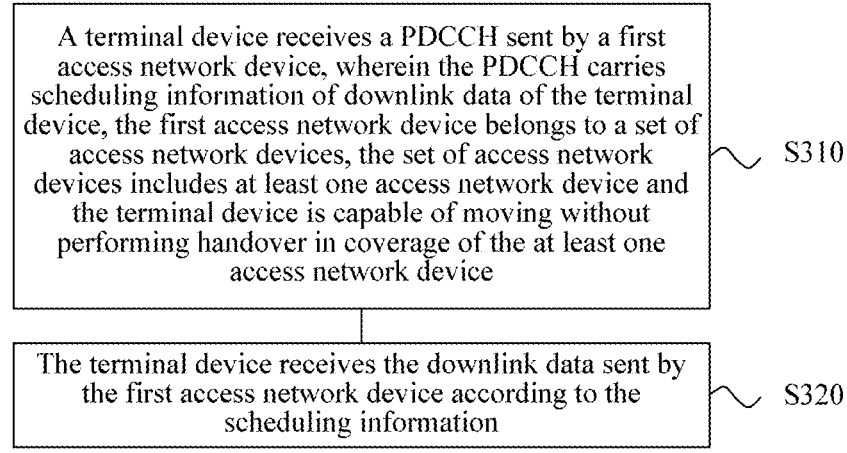
FIG. 7 is a schematic diagram of a method for transmitting data according to another embodiment of the disclosure.

FIG. 7 is a schematic diagram of a method for transmitting data 300 according to an embodiment of the disclosure. An execution body of the method 300 may be a terminal device. The method 300 includes the following operations.

In S310, the terminal device receives a PDCCH sent by a first access network device, wherein the PDCCH carries scheduling information of downlink data of the terminal device, the first access network device belongs to a set of access network devices, the set of access network devices includes at least one access network device and the terminal device is capable of moving without performing handover in coverage of the at least one access network device.

In S320, the terminal device receives the downlink data sent by the first access network device according to the scheduling information.

Specifically, the terminal device intended to receive the downlink data may monitor the PDCCH, and the PDCCH carries the scheduling information. That is, the UE is required to demodulate the scheduling information of the PDCCH at first to determine the PDCCH required to be received and then receives the downlink data belonging to itself based on the demodulated scheduling information (i.e., a resource configuration and the like). Therefore, the first access network device sends the PDCCH carrying the scheduling information to the terminal device, and the first access network device is any access network device in the set of access network devices. That is, each access network device in the set of access network devices sends the PDCCH carrying the scheduling information to the terminal device. Only one access network device may successfully send the PDCCH to the terminal device. That is, the terminal device may only receive the PDCCH sent by the access network device (represented as the first access network device) to which the terminal device belongs.

It is to be noted that the first access network device is any access network device in the set of access network devices, and the set of access network devices includes at least one access network device. The terminal device may freely move in the coverage of all the access network devices in the set of access network devices without handover of access network devices.

In an optional embodiment of the disclosure, the method 300 further includes the following operations. The terminal device receives resource configuration information sent by the first access network device, wherein the resource configuration information is configured for the terminal device to send uplink data. The terminal device sends the uplink data to the first access network device according to the resource configuration information.

Specifically, the terminal device receives the resource configuration information for the uplink data from the first access network device and may send the uplink data to the first access network device according to the resource configuration information. In such a manner, the terminal device may send the uplink data without recovering the high-layer signaling connection. Therefore, power consumption of the terminal device is reduced.

In an optional embodiment of the disclosure, the operation that the terminal device receives the resource configuration information sent by the first access network device includes that: the terminal device receives the resource configuration information carried in the downlink data or the PDCCH.

Specifically, the terminal device may receive the downlink data or the PDCCH to receive the resource configuration information. That is, the resource configuration information may be carried in the downlink data or the PDCCH. In such a manner, the terminal device may send the uplink data without independently sending the resource configuration information as well as recovering the high-layer signaling connection. Therefore, the power consumption of the terminal device is further reduced.

In an optional embodiment of the disclosure, the resource configuration information includes at least one of a dedicated resource or an access sequence for the uplink data.

Specifically, the terminal device may receive the dedicated resource, carried in the downlink data or the PDCCH, for the uplink data from the first access network device, or the first access network device carries a specific access sequence for uplink data random access of the uplink data into the downlink data or the PDCCH. In such a manner, the terminal device may send the uplink data without recovering the high-layer signaling connection. Therefore, the power consumption of the terminal device is reduced.

In an optional embodiment of the disclosure, before the operation that the downlink data sent by the first access network device is received, the method 300 further includes the following operations. The terminal device receives an RNTI sent by the first access network device, and the terminal device demodulates the scheduling information according to the RNTI.

Specifically, the terminal device receives the RNTI sent by the access network device and demodulates the received PDCCH according to the RNTI to obtain the scheduling information carried in the PDCCH. The terminal device may receive the downlink data without recovering a high-layer signaling connection. Therefore, the power consumption of the terminal device is reduced.

In an optional embodiment of the disclosure, the operation that the terminal device receives the RNTI sent by the first access network device includes that: the terminal device receives system information sent by the first access network device. The system information carries the RNTI.

Specifically, the terminal device may receive the RNTI in the system information, demodulate and obtain the scheduling information carried in the PDCCH according to the RNTI. The terminal device may receive the downlink data without recovering the high-layer signaling connection. Therefore, the power consumption of the terminal device is reduced.

In an optional embodiment of the disclosure, the method further includes that: the terminal device receives characteristic information of the first access network device. The operation that the terminal device receives the PDCCH sent by the first access network device may include that: the terminal device receives the PDCCH sent by the first access network device according to the characteristic information.

Specifically, the terminal device receives the characteristic information of the PDCCH from the first access network device and may accurately receive the PDCCH according to the characteristic information. Therefore, system efficiency is improved.

In an optional embodiment of the disclosure, the method 300 further includes the operation that the terminal device receives the characteristic information of the first access network device, which includes the following action. The terminal device receives the system information sent by the first access network device, and the system information carries the characteristic information of the first access network device.

Specifically, the terminal device receives the system information sent by the first access network device and thus may accurately receive the PDCCH.

In an optional embodiment of the disclosure, the characteristic information includes at least one of time-domain resource information, frequency-domain resource information, subcarrier spacing information or subframe structure information.

Specifically, the first access network device sends the PDCCH through a preset time-domain location (namely periodically) and the terminal device is required to receive the PDCCH in a Discontinuous Reception (DRX) manner. The first access network device sends the PDCCH through other characteristic information and the terminal device accurately receives the PDCCH according to the received corresponding characteristic information.

In an optional embodiment of the disclosure, the downlink data is user-plane data or control-plane data.

The control-plane data may be an RRC message, for example, a paging message.

According to the method for transmitting data of the embodiment of the disclosure, the terminal device receives the PDCCH sent by the first access network device in the set of access network devices, the set of access network devices includes at least one access network device, the terminal device may move without performing handover in the coverage of the at least one access network device, and the first access network device sends the downlink data to the terminal device, such that the terminal device may receive the downlink data without recovering the high-layer signaling connection. Therefore, the system efficiency is improved, and the power consumption of the terminal device is reduced.

Figure 8:
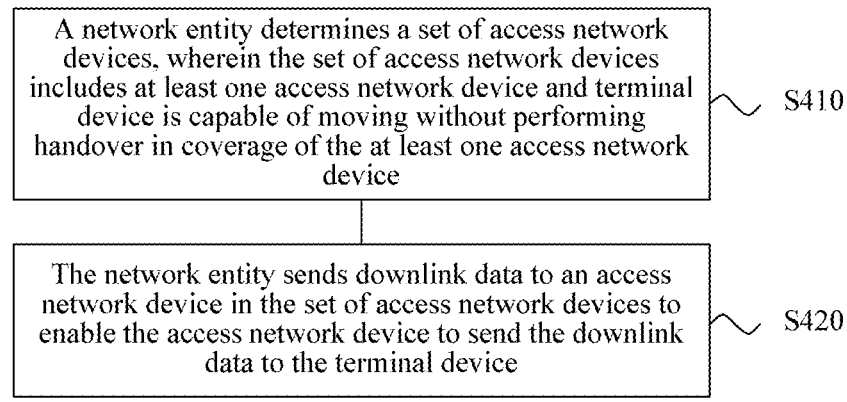
FIG. 8 is a schematic diagram of a method for transmitting data according to another embodiment of the disclosure.

FIG. 8 is a schematic diagram of a method for transmitting data 400 according to an embodiment of the disclosure. An execution body of the method 400 may be a network entity. The method 400 includes the following operations.

In S410, the network entity determines a set of access network devices, wherein the set of access network devices includes at least one access network device and terminal device is capable of moving without performing handover in coverage of the at least one access network device.

In S420, the network entity sends downlink data to an access network device in the set of access network devices to enable the access network device to send the downlink data to the terminal device.

The set of access network devices includes at least one access network device and the set of access network devices may be managed through a logical entity (represented as the network entity). For example, the network entity may know the number of the access network devices in the set of access network devices, configuration, storage and the like of terminal context information, connection of a user bearer between the access network device and a CN device and the like. A network side may send the downlink data to the network entity for the network entity to forward to each access network device in the set of access network devices. Each access network device in the set of access network devices sends the downlink data to the terminal device to enable the terminal device to receive the downlink data without recovering a high-layer signaling connection. Therefore, system efficiency is improved and power consumption of the terminal device is reduced.

In an optional embodiment of the disclosure, the network entity is a CN device. The operation that the network entity sends the downlink data to the access network device in the set of access network devices includes that: the CN device sends the downlink data to each access network device in the at least one access network device.

When the network entity is the CN device and there is downlink data required to be sent, a network side (for example, a server) may directly send the downlink data to the CN device, and the CN forwards it to each access network device in the set of access network devices. When no direct connection exists between the CN device and the access network device, the CN device may establish a connection with the access network device firstly and then sends the downlink data to the terminal device through each access network device in the set of access network devices, such that the terminal device is capable of receiving the downlink data without recovering the high-layer signaling connection. Therefore, the system efficiency is improved and the power consumption of the terminal device is reduced.

In an optional embodiment of the disclosure, the network entity is a second access network device in the set of access network devices. The operation that the network entity sends the downlink data to the access network device in the set of access network devices includes that: the second access network device sends the downlink data to all the access network devices, except the second access network device, in the set of access network devices.

The second access network device may send the downlink data to all the access network devices, except the second access network device, in the first set of access network devices and then the other access network devices in the set of access network devices may simultaneously send the downlink data to the terminal device, so as to enable the terminal device to receive the downlink data without recovering the high-layer signaling connection. Therefore, the system efficiency is improved and the power consumption of the terminal device is reduced.

In an optional embodiment of the disclosure, the method further includes that the second access network device sends the downlink data to the terminal device.

The second access network device may also send the downlink data to a network covered by itself. That is, all the access network devices in the set of access network devices may simultaneously send the downlink data to the terminal device, so as to enable the terminal device to receive the downlink data without recovering the high-layer signaling connection. Therefore, the system efficiency is improved and the power consumption of the terminal device is reduced.

In an optional embodiment of the disclosure, the method 400 further includes the following operations. The network entity receives indication information sent by a first access network device in the access network device, wherein the indication information is configured to indicate the network entity only to send subsequent downlink data to the second access network device. The network entity only sends the subsequent downlink data to the first access network device.

The network entity may receive the indication information sent by the first access network device responsive to determining that the terminal device belongs to the first access network device, and the network entity may only send the downlink data to the first access network device. Therefore, system power consumption is reduced.

In an optional embodiment of the disclosure, the method 400 further includes that the network entity sends resource configuration information to the terminal device through the access network device in the set of access network devices. The resource configuration information is configured for the terminal device to send uplink data.

The network entity may send the resource configuration information for the uplink data to the terminal device through the access network device in the set of access network devices, so as to enable the terminal device to send the uplink data to the access network device according to the resource configuration information. In such a manner, the terminal device may send the uplink data without recovering the high-layer connection. Therefore, the power consumption of the terminal device is reduced.

In an optional embodiment of the disclosure, the resource configuration information includes at least one of a dedicated resource or an access sequence for the uplink data.

In an optional embodiment of the disclosure, the method 400 further includes that the network entity sends characteristic information of the PDCCH to the terminal device through the access network device in the set of access network devices. The characteristic information is configured to indicate the terminal device to receive the PDCCH.

The network entity may configure the characteristic information for the PDCCH and send it to the terminal device through the access network device in the set of access network devices. The characteristic information may be transmitted among network nodes as context information.

In an optional embodiment of the disclosure, the characteristic information includes at least one of time-domain resource information, frequency-domain resource information, subcarrier spacing information or subframe structure information.

In an optional embodiment of the disclosure, the downlink data is user-plane data or control-plane data.

The control-plane data may be an RRC message, for example, a paging message.

According to the method for transmitting data of the embodiment of the disclosure, the network entity determines the set of access network devices including at least one access network device and sends the downlink data of the terminal device to the access network device in the set of access network devices, the access network device sends the downlink data to the terminal device, and the terminal device may move without performing handover in the coverage of the at least one access network device. In such a manner, the terminal device may receive the downlink data without recovering the high-layer signaling connection. Therefore, the system efficiency is improved and the power consumption of the terminal device is improved.

The embodiments of the disclosure will be described below in combination with FIG. 9 in detail. It is to be noted that this is adopted not to limit the scope of the embodiments of the disclosure but only to help those skilled in the art to better understand the embodiments of the disclosure.

In 601, an access network device sends a PDCCH to a terminal device. The PDCCH carries scheduling information of downlink data of the terminal device.

Figure 9:
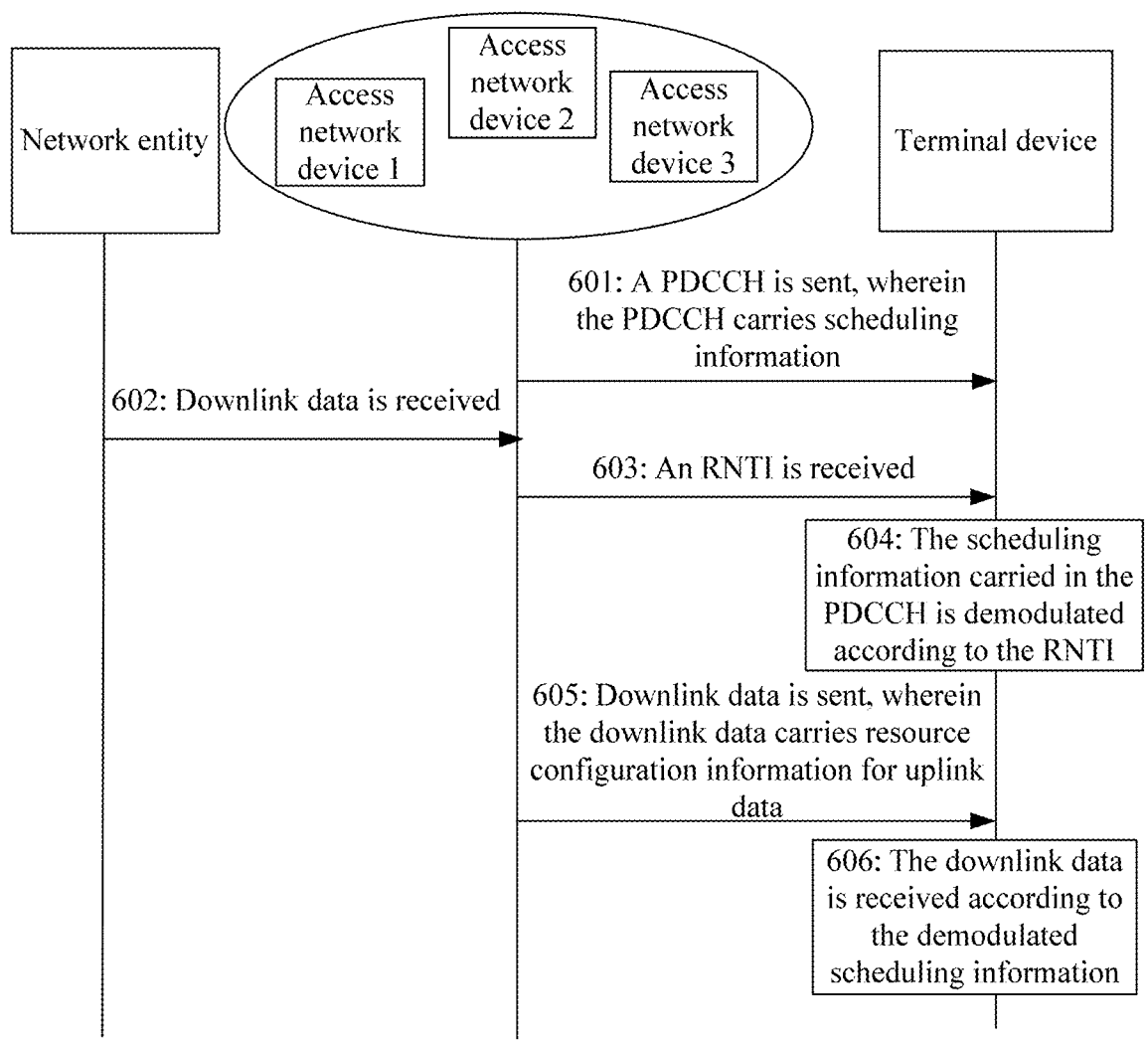
FIG. 9 is a schematic flowchart of a method for transmitting data according to another embodiment of the disclosure.

The access network device is any access network device in a set of access network devices and the set of access network devices includes at least one access network device (for example, access network device 1, access network device 2 and access network device 3 in FIG. 9). The terminal device may freely move in coverage of all the access network devices in the set of access network devices without handover of the access network devices. That is, each access network device in the set of access network devices sends the PDCCH to the terminal device.

In an optional embodiment, the access network device sends characteristic information of the PDCCH to the terminal device, and the characteristic information is configured to indicate the terminal device to receive the PDCCH.

In 602, the access network device receives the downlink data sent by a network entity.

The network entity may be a certain access network device in the set of access network devices or a CN device or an independent network entity outside the set of access network devices or the like. There are no limits made thereto in the disclosure.

It is to be understood that operation in 602 may be executed at the same time of operation in 602 or before operation in 601. There are no limits made thereto in the disclosure.

In 603, the terminal device receives an RNTI.

Each access network device in the set of access network devices sends the PDCCH and the downlink data to the terminal device, but only one access network device (represented as the access network device 1) may successfully send the PDCCH and the downlink data to the terminal device.

In 604, the terminal device demodulates the scheduling information, carried in the PDCCH, of the downlink data according to the RNTI.

In 605, the access network device 1 sends the downlink data, and the downlink data carries resource configuration information for uplink data.

In an optional embodiment, the resource configuration information for the uplink data may also be carried in the PDCCH in operation in 601. There are no limits made thereto in the disclosure.

In 606, the terminal device receives the downlink data sent by the access network device 1 according to the scheduling information.

In such a manner, the terminal device may send the uplink data to the access network device 1 according to the resource configuration information. In an optional embodiment, the resource configuration information includes at least one of a dedicated resource or an access sequence for the uplink data. After receiving the uplink data, the access network device 1 may determine that the terminal device is presently within its coverage. The access network device 1 may send indication information to the network entity or the CN device, and the network entity or the CN device may only send the downlink data to the first access network device.

In an optional embodiment, the access network device 1 may send to other access network devices (the access network device 2 and the access network device 3) in the set of access network devices indication information configured to indicate to stop sending the downlink data to the terminal device.

According to the method for transmitting data of the embodiments of the disclosure, each access network device in the set of access network devices sends the PDCCH carrying the scheduling information of the downlink data of the terminal device to the terminal device, the set of access network devices includes at least one access network device, the terminal device may move without handover in the coverage of the at least one access network device, and each access network device in the set of access network devices sends the downlink data to the terminal device, such that the terminal device may receive the downlink data without recovering a high-layer signaling connection. Therefore, system efficiency is improved, and power consumption of the terminal device is reduced.

It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

The method for transmitting data according to the embodiments of the disclosure is described above in detail. An access network device, a terminal device and a network entity according to the embodiments of the disclosure will be described below.

Figure 10:
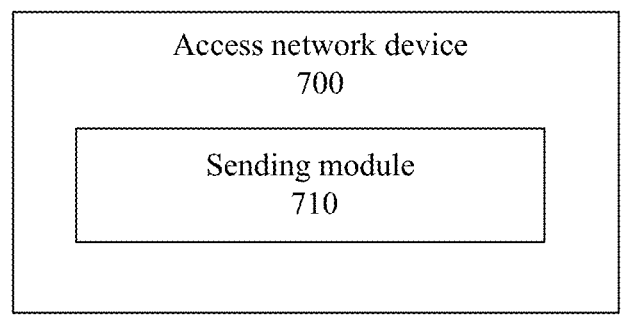
FIG. 10 is a schematic block diagram of an access network device according to an embodiment of the disclosure.

FIG. 10 is a schematic block diagram of an access network device 700 according to an embodiment of the disclosure. As illustrated in FIG. 10, the access network device 700 includes a sending module 710.

The sending module 710 is configured to send a PDCCH to a terminal device. The PDCCH carries scheduling information of downlink data of the terminal device, the first access network device is any access network device in a set of access network devices, the set of access network devices includes at least one access network device and the terminal device is capable of moving without performing handover in coverage of the at least one access network device.

The sending module 710 is further configured to send the downlink data to the terminal device.

In an optional embodiment of the disclosure, the first access network device may further include a receiving module.

The receiving module may be configured to receive the downlink data sent by a network entity.

In an optional embodiment of the disclosure, the network entity may be a CN device.

In an optional embodiment of the disclosure, the network entity may be a second access network device in the set of access network devices.

In an optional embodiment of the disclosure, the receiving module may further be configured to receive resource configuration information sent by the network entity. The resource configuration information may be configured for the terminal device to send uplink data.

The sending module 710 may further be configured to send the resource configuration information to the terminal device.

In an optional embodiment of the disclosure, the sending module 710 may specifically be configured to send the resource configuration information through the downlink data or the PDCCH.

In an optional embodiment of the disclosure, the first access network device may further include the receiving module, further configured to receive the uplink data sent by the terminal device. The sending module 710 may further be configured to send first indication information to other access network devices in the set of access network devices. The first indication information may be configured to indicate sending of the downlink data to the terminal device to be stopped.

In an optional embodiment of the disclosure, the receiving module may further be configured to receive the uplink data sent by the terminal device. The sending module 710 may further be configured to send second indication information to the network entity. The second indication information may be configured to indicate the network entity only to send subsequent downlink data to the first access network device, and the downlink data sent to the terminal device may be from or pass through the network entity.

In an optional embodiment of the disclosure, the resource configuration information may include at least one of a dedicated resource or an access sequence for the uplink data.

In an optional embodiment of the disclosure, the first access network device may further include a determination module. The determination module may be configured to determine the characteristic information of the PDCCH, wherein the characteristic information may be configured when the first access network device is connected with the terminal device. The sending module 710 may further be configured to send the characteristic information to the terminal device, wherein the characteristic information may be configured to indicate the terminal device to receive the PDCCH.

In an optional embodiment of the disclosure, the characteristic information may be configured when a high-layer signaling connection exists between the first access network device and the terminal device.

In an optional embodiment of the disclosure, the receiving module may further be configured to receive characteristic information of the PDCCH from the network entity, wherein the characteristic information may be configured by the network entity.

The sending module 710 may further be configured to send the characteristic information to the terminal device. The characteristic information may be configured to indicate the terminal device to receive the PDCCH.

In an optional embodiment of the disclosure, the characteristic information may be configured by the network entity.

In an optional embodiment of the disclosure, the sending module 710 may specifically be configured to send the carried characteristic information to the terminal device through system information.

In an optional embodiment of the disclosure, the characteristic information may include at least one of time-domain resource information, frequency-domain resource information, subcarrier spacing information or subframe structure information.

In an optional embodiment of the disclosure, the scheduling information may be scheduling information scrambled with an RNTI corresponding to the terminal device. The sending module 710 may further be configured to send the RNTI to the terminal device, wherein the RNTI may be configured for the terminal device to demodulate the scheduling information. The RNTI may be the same as RNTIs with which scheduling information carried by PDCCHs of other access network devices in the set of access network devices are scrambled. The RNTI may be configured when the high-layer signaling connection exists between the first access network device and the terminal device, or the RNTI may be pre-configured and sent to each access network device in the set of access network devices by the network entity.

In an optional embodiment of the disclosure, the scheduling information may be scheduling information scrambled with the RNTI. The sending module 710 may further be configured to send the system information to the terminal device. The system information carries the RNTI and the RNTI is configured for the terminal device to demodulate the scheduling information.

In an optional embodiment of the disclosure, the downlink data may be user-plane data or control-plane data.

In the embodiment of the disclosure, the first access network device sends the PDCCH carrying the scheduling information of the downlink data of the terminal device to the terminal device, the set of access network devices includes at least one access network device, the terminal device may move without handover in the coverage of the at least one access network device, and the first access network device sends the downlink data to the terminal device, such that the terminal device may receive the downlink data without recovering a high-layer signaling connection. Therefore, system efficiency is improved, and power consumption of the terminal device is reduced.

Figure 11:
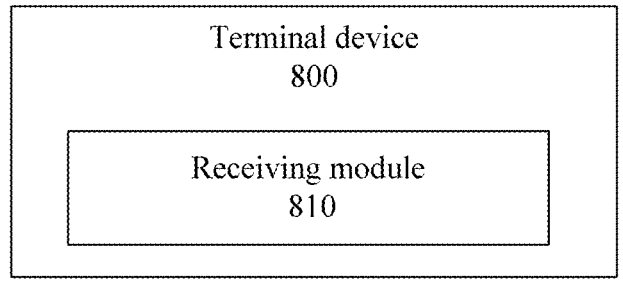
FIG. 11 is a schematic block diagram of a terminal device according to an embodiment of the disclosure.

FIG. 11 is a schematic block diagram of a terminal device 800 according to an embodiment of the disclosure. As illustrated in FIG. 11, the terminal device 800 includes a receiving module 810.

The receiving module 810 is configured to receive a PDCCH sent by a first access network device, wherein the PDCCH carries scheduling information of downlink data of the terminal device. The first access network device is an access network device in a set of access network devices, the set of access network devices includes at least one access network device and the terminal device is capable of moving without performing handover in coverage of the at least one access network device.

The receiving module 810 is further configured to receive the downlink data sent by the first access network device according to the scheduling information.

In an optional embodiment of the disclosure, the receiving module may further be configured to receive resource configuration information sent by the first access network device, wherein the resource configuration information may be configured for the terminal device to send uplink data. A sending module may be configured to send the uplink data to the first access network device according to the resource configuration information.

In an optional embodiment of the disclosure, the receiving module 810 may specifically be configured to receive the resource configuration information carried in the downlink data or the PDCCH.

In an optional embodiment of the disclosure, the resource configuration information may include at least one of a dedicated resource or an access sequence for the uplink data.

In an optional embodiment of the disclosure, the receiving module 810 may further be configured to receive an RNTI sent by the first access network device. A processing module may be configured to demodulate the scheduling information according to the RNTI.

In an optional embodiment of the disclosure, the receiving module 810 may specifically be configured to receive system information sent by the first access network device, wherein the system information carries the RNTI.

In an optional embodiment of the disclosure, the receiving module 810 may further be configured to receive characteristic information of the first access network device. The receiving module 810 may specifically be configured to receive the PDCCH sent by the first access network device according to the characteristic information.

In an optional embodiment of the disclosure, the receiving module 810 may specifically be configured to receive system information sent by the first access network device, wherein the system information carries the characteristic information of the first access network device.

In an optional embodiment of the disclosure, the characteristic information may include at least one of time-domain resource information, frequency-domain resource information, subcarrier spacing information or subframe structure information.

In an optional embodiment of the disclosure, the downlink data may be user-plane data or control-plane data.

In the embodiment of the disclosure, the terminal device receives the PDCCH sent by the first access network device in the set of access network devices, the set of access network devices includes at least one access network device, the terminal device may move without handover in the coverage of the at least one access network device, the first access network device sends the downlink data to the terminal device, such that the terminal device may receive the downlink data without recovering the high-layer signaling connection. Therefore, system efficiency is improved, and power consumption of the terminal device is reduced.

Figure 12:
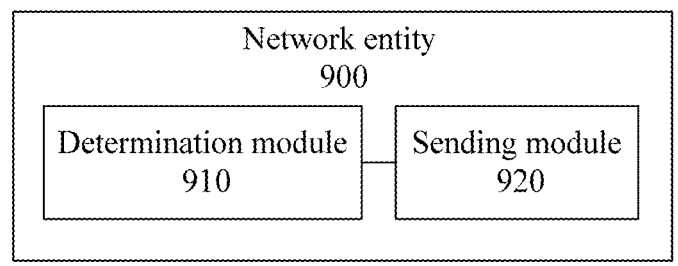
FIG. 12 is a schematic block diagram of a network entity according to an embodiment of the disclosure.

FIG. 12 is a schematic block diagram of a network entity 900 according to an embodiment of the disclosure. As illustrated in FIG. 12, the network entity 900 includes a determination module 910 and a sending unit 920.

The determination module 910 is configured to send a PDCCH to an access network device in a set of access network devices. The PDCCH carries scheduling information of downlink data of terminal device, the set of access network devices includes at least one access network device and the terminal device is capable of moving without performing handover in coverage of the at least one access network device.

The sending module 920 is configured to send the downlink data to the access network device in the set of access network devices to enable the access network device to send the downlink data to the terminal device.

In an optional embodiment of the disclosure, the network entity may be a CN device. The sending module 920 may specifically be configured to send the downlink data to each of the at least one access network device.

In an optional embodiment of the disclosure, the network entity may be a second access network device in the set of access network devices. The sending module 920 may specifically be configured to send the downlink data to all the access network devices, except the second access network device, in the set of access network devices.

In an optional embodiment of the disclosure, the sending module 920 may further be configured to send the PDCCH to the terminal device, wherein the PDCCH carries the scheduling information of the downlink data of the terminal device. The sending module may further be configured to send the downlink data to the terminal device.

In an optional embodiment of the disclosure, the receiving module may further be configured to receive indication information sent by a first access network device in the set of access network devices, wherein the indication information is configured to indicate the network entity only to send subsequent downlink data to the second access network device. The sending module 920 may further be configured to only send the subsequent downlink data to the first access network device.

In an optional embodiment of the disclosure, the sending module 920 may further be configured to send resource configuration information to the terminal device through the access network device in the set of access network devices. The resource configuration information may be configured for the terminal device to send uplink data.

In an optional embodiment of the disclosure, the resource configuration information may include at least one of a dedicated resource or an access sequence for the uplink data.

In an optional embodiment of the disclosure, the sending module 920 may further be configured to send characteristic information of the PDCCH to the terminal device through the access network device in the set of access network devices. The characteristic information may be configured to indicate the terminal device to receive the PDCCH.

In an optional embodiment of the disclosure, the characteristic information may include at least one of time-domain resource information, frequency-domain resource information, subcarrier spacing information or subframe structure information.

In an optional embodiment of the disclosure, the downlink data may be user-plane data or control-plane data.

In the embodiment of the disclosure, the network entity determines the set of access network devices including at least one access network device and sends the downlink data of the terminal device to the access network device in the set of access network devices, the access network device sends the downlink data to the terminal device, and the terminal device may move without handover in the coverage of the at least one access network device. In such a manner, the terminal device may receive the downlink data without recovering the high-layer signaling connection. Therefore, system efficiency is improved and power consumption of the terminal device is improved.

Figure 13:
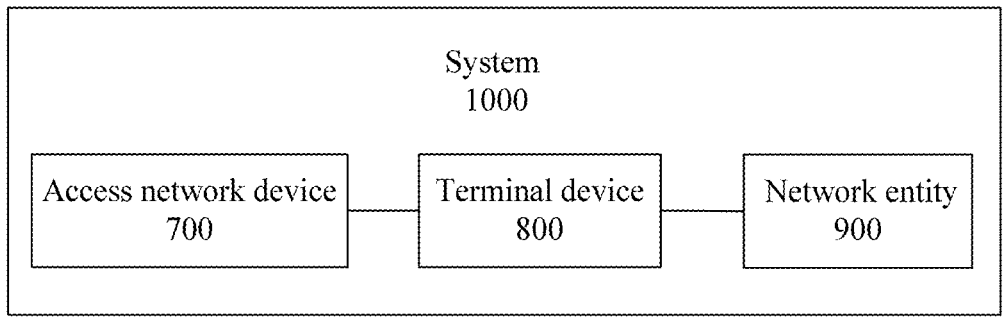
FIG. 13 is a schematic block diagram of a system according to an embodiment of the disclosure.

FIG. 13 is a schematic block diagram of a data transmission system 1000 according to an embodiment of the disclosure. The system 1000 includes the access network device 700 of the embodiments of the disclosure, the terminal device 800 of the embodiments of the disclosure and the network entity 900 of the embodiment of the disclosure mentioned above.

Figure 14:
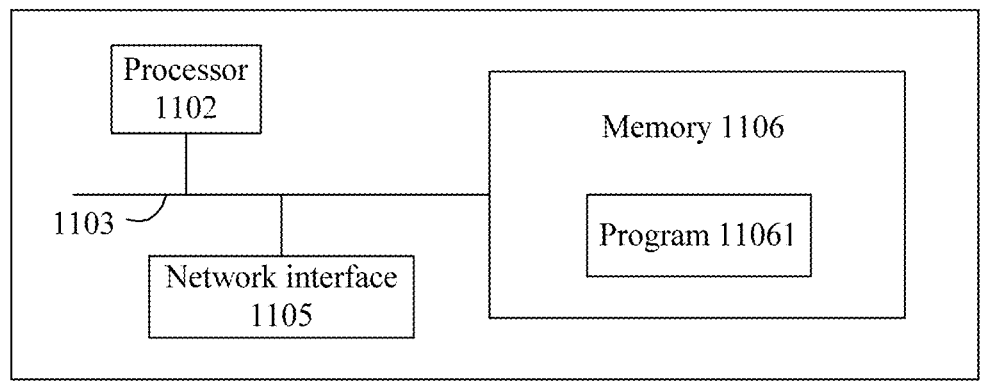
FIG. 14 is a schematic structure diagram of an access network device according to an embodiment of the disclosure.

FIG. 14 illustrates a structure of an access network device according to an embodiment of the disclosure. The access network device includes at least one processor 1102 (for example, a universal Central Processing Unit (CPU) with a computing and processing capability, a Digital Signal Processor (DSP), an Application Specific Integrated Circuit (ASIC) and a Field-Programmable Gate Array (FPGA)). The processor manages and schedules each module and device in an On Board Unit (OBU) device. The access network device further includes at least one network interface 1105 or another communication interface, a memory 1106 and at least one bus system 1103. Components of the OBU are coupled together through the bus system 1103. The bus system 1103 may include a data bus, a power bus, a control bus, a state signal bus and the like. For clear description, each bus is marked as the bus system 1103 in FIG. 14.

The methods disclosed in the embodiments of the disclosure may be applied to the processor 1102 or are adopted to execute an executable module, for example, a computer program, stored in the memory 1106. The memory 1106 may include a high-speed Random Access Memory (RAM) and may also include a non-volatile memory. The memory may include a Read-Only Memory (ROM) and a RAM, and provides required signaling or data, program and the like to the processor. A part of the memory may further include a Non-Volatile RAM (NVRAM). A communication connection with at least one other network element is implemented through at least one network interface 1105 (which may be wired or wireless).

In some implementation modes, the memory 1106 stores a program 11061, and the processor 1102 executes the program 11061 to execute the following operations.

A PDCCH is sent to a terminal device through the network interface 1105. The PDCCH carries scheduling information of downlink data of the terminal device, the access network device is any access network device in a set of access network devices, the set of access network devices includes at least one access network device and the terminal device is capable of moving without performing handover in coverage of the at least one access network device.

The downlink data is sent to the terminal device through the network interface 1105.

It is to be noted that the access network device may specifically be the access network device in the abovementioned embodiments and may be configured to execute each operation and/or flow corresponding to the access network device in the abovementioned method embodiments.

From the abovementioned technical solution provided by the embodiments of the disclosure, it can be seen that the first access network device sends the PDCCH carrying the scheduling information of the downlink data of the terminal device to the terminal device, the set of access network devices includes at least one access network device, the terminal device may move without handover in the coverage of the at least one access network device, and the first access network device sends the downlink data to the terminal device, such that the terminal device may receive the downlink data without recovering a high-layer signaling connection. Therefore, system efficiency is improved, and power consumption of the terminal device is reduced.

Figure 15:
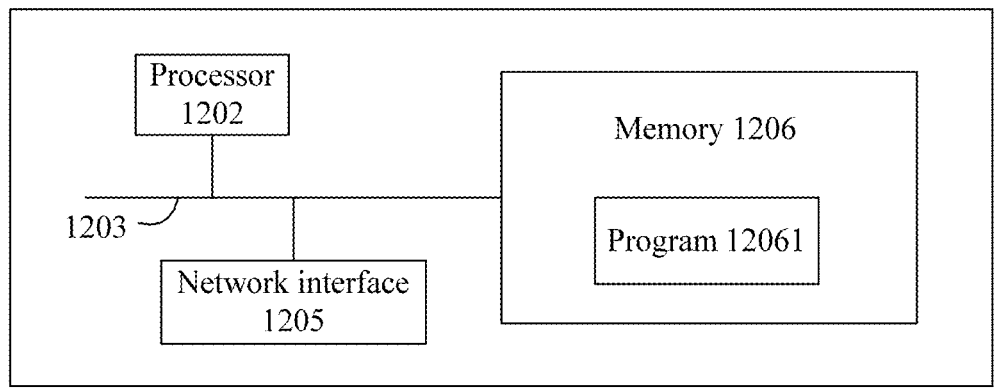
FIG. 15 is a schematic structure diagram of a terminal device according to an embodiment of the disclosure.

FIG. 15 illustrates a structure of a terminal device according to an embodiment of the disclosure. The terminal device includes at least one processor 1202 (for example, a universal CPU with a computing and processing capability, a DSP, an ASIC and an FPGA). The processor manages and schedules each module and device in an OBU device. The terminal device further includes at least one network interface 1205 or another communication interface, a memory 1206 and at least one bus system 1203. Components of the OBU are coupled together through the bus system 1203. The bus system 1203 may include a data bus, a power bus, a control bus, a state signal bus and the like. For clear description, each bus is marked as the bus system 1203 in the FIG. 15.

The methods disclosed in the embodiments of the disclosure may be applied to the processor 1202 or are adopted to execute an executable module, for example, a computer program, stored in the memory 1206. The memory 1206 may include a high-speed RAM and may also include a non-volatile memory. The memory may include a ROM and a RAM, and provides required signaling or data, program and the like to the processor. A part of the memory may further include an NVRAM. A communication connection with at least one other network element is implemented through at least one network interface 1205 (which may be wired or wireless).

In some implementation modes, the memory 1206 stores a program 12061, and the processor 1202 executes the program 12061 to execute the following operations.

A PDCCH sent by a first access network device is received through the network interface 1205. The PDCCH carries scheduling information of downlink data of the terminal device, the first access network device belongs to a set of access network devices, the set of access network devices includes at least one access network device and the terminal device is capable of moving without performing handover in coverage of the at least one access network device.

The downlink data sent by the first access network device is received through the network interface 1205 according to the scheduling information.

It is to be noted that the terminal device may specifically be the terminal device in the abovementioned embodiments and may be configured to execute each operation and/or flow corresponding to the terminal device in the abovementioned method embodiments.

From the abovementioned technical solution provided by the embodiment of the disclosure, it can be seen that the terminal device receives the PDCCH sent by the first access network device in the set of access network devices, the set of access network devices includes at least one access network device, the terminal device may move without handover in the coverage of the at least one access network device, and the first access network device sends the downlink data to the terminal device, such that the terminal device may receive the downlink data without recovering a high-layer signaling connection. Therefore, system efficiency is improved, and power consumption of the terminal device is reduced.

Figure 16:
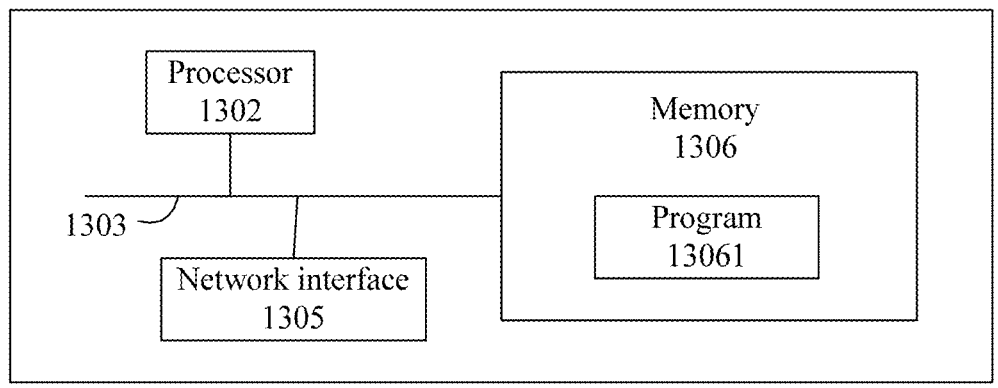
FIG. 16 is a schematic structure diagram of a network entity according to an embodiment of the disclosure.

FIG. 16 illustrates a structure of a network entity according to an embodiment of the disclosure. The network entity includes at least one processor 1302 (for example, a universal CPU with a computing and processing capability, a DSP, an ASIC and an FPGA). The processor manages and schedules each module and device in an OBU device. The network entity further includes at least one network interface 1305 or another communication interface, a memory 1306 and at least one bus system 1303 are further included. Components of the OBU are coupled together through the bus system 1303. The bus system 1303 may include a data bus, a power bus, a control bus, a state signal bus and the like. For clear description, each bus is marked as the bus system 1303 in FIG. 16.

The methods disclosed in the embodiments of the disclosure may be applied to the processor 1302 or are adopted to execute an executable module, for example, a computer program, stored in the memory 1306. The memory 1306 may include a high-speed RAM and may also include a non-volatile memory. The memory may include a ROM and a RAM, and provides required signaling or data, program and the like to the processor. A part of the memory may further include an NVRAM. A communication connection with at least one other network element is implemented through the at least one network interface 1305 (which may be wired or wireless).

In some implementation modes, the memory 1306 stores a program 13061, and the processor 1302 executes the program 13061 to execute the following operations.

A set of access network devices is determined through the network interface 1305. The set of access network devices includes at least one access network device and a terminal device is capable of moving without performing handover in coverage of the at least one access network device, Downlink data is sent to an access network device in the set of access network devices through the network interface 1305, to enable the access network device to send the downlink data to the terminal device.

It is to be noted that the network entity may specifically be the network entity in the abovementioned embodiments and may be configured to execute each operation and/or flow corresponding to the network entity in the abovementioned method embodiments.

From the abovementioned technical solution provided by the embodiment of the disclosure, it can be seen that the network entity determines the set of access network devices including at least one access network device and sends the downlink data of the terminal device to the access network device in the set of access network devices, the access network device sends the downlink data to the terminal device, and the terminal device may move without handover in the coverage of the at least one access network device. In such a manner, the terminal device may receive the downlink data without recovering a high-layer signaling connection. Therefore, system efficiency is improved and power consumption of the terminal device is improved.

An embodiment of the disclosure further provides a computer storage medium, which may store a program instruction configured to indicate any abovementioned method.

In an optional embodiment, the storage medium may specifically be the memory 1106, 1206 or 1306.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting data with a terminal device in an inactive state, comprising:
   sending, by a first access network device, a Physical Downlink Control Channel (PDCCH) to the terminal device, the PDCCH carrying scheduling information of downlink data of the terminal device, wherein the first access network device is any access network device in a set of access network devices, the set of access network devices comprises at least two access network devices and the terminal device is capable of moving without performing handover in coverage of the at least two access network devices, wherein each access network device in the set of access network devices stores context information of the terminal device and establishes a network connection with the terminal device in advance, such that the terminal device is capable of moving without performing handover in the coverage of the at least two access network devices; and
   sending, by the first access network device, the downlink data to the terminal device.

2. The method of claim 1, before sending, by the first access network device, the downlink data to the terminal device, further comprising:
   receiving, by the first access network device, the downlink data sent by a network entity.

3. The method of claim 2, wherein the network entity is a Core Network (CN) device or a second access network device in the set of access network devices.

4. The method of claim 1, further comprising:
   receiving, by the first access network device, resource configuration information sent by the network entity, wherein the resource configuration information is configured for the terminal device to send uplink data; and
   sending, by the first access network device, the resource configuration information to the terminal device;
   wherein the resource configuration information comprises at least one of a dedicated resource or an access sequence for the uplink data.

5. The method of claim 4, further comprising:
   receiving, by the first access network device, the uplink data sent by the terminal device;
   sending, by the first access network device, first indication information to other access network devices in the set of access network devices, wherein the first indication information is configured to indicate to stop sending the downlink data to the terminal device; or,
   sending, by the first access network device, second indication information to the network entity, wherein the second indication information is configured to indicate the network entity only to send subsequent downlink data to the first access network device, the downlink data sent to the terminal device being from or passing through the network entity.

6. The method of claim 1, before sending, by the first access network device, the PDCCH to the terminal device, further comprising:
   determining, by the first access network device, characteristic information of the PDCCH; and
   sending, by the first access network device, the characteristic information to the terminal device, wherein the characteristic information is configured to indicate the terminal device to receive the PDCCH;

wherein the characteristic information is configured when a high-layer signaling connection exists between the first access network device and the terminal device.

7. The method of claim 1, before sending, by the first access network device, the PDCCH to the terminal device, further comprising:
receiving, by the first access network device, characteristic information of the PDCCH from the network entity; and
sending, by the first access network device, the characteristic information to the terminal device, wherein the characteristic information is configured to indicate the terminal device to receive the PDCCH;
wherein the characteristic information is configured by the network entity.

8. The method of claim 1, further comprising:
sending, by the first access network device, characteristic information of the PDCCH to the terminal device through system information.

9. The method of claim 1, wherein the scheduling information is scheduling information scrambled with a Radio Network Temporary Identity (RNTI) corresponding to the terminal device, the RNTI is the same as RNTIs with which scheduling information carried by PDCCHs of other access network devices in the set of access network devices are scrambled, the RNTI is configured when the high-layer signaling connection exists between the first access network device and the terminal device, or the RNTI is pre-configured and sent to each access network device in the set of access network devices by the network entity; and
before sending, by the first access network device, the downlink data to the terminal device, the method further comprises:
sending, by the first access network device, the RNTI to the terminal device, wherein the RNTI is configured for the terminal device to demodulate the scheduling information.

10. A method for transmitting data with a terminal device in an inactive state, comprising:
receiving, by the terminal device, a Physical Downlink Control Channel (PDCCH) sent by a first access network device, the PDCCH carrying scheduling information of downlink data of the terminal device, wherein the first access network device belongs to a set of access network devices, the set of access network devices comprises at least two access network devices and the terminal device is capable of moving without performing handover in coverage of the at least two access network devices, wherein each access network device in the set of access network devices stores context information of the terminal device and establishes a network connection with the terminal device in advance, such that the terminal device is capable of moving without performing handover in the coverage of the at least two access network devices; and
receiving, by the terminal device, the downlink data sent by the first access network device according to the scheduling information.

11. The method of claim 10, further comprising:
receiving, by the terminal device, resource configuration information sent by the first access network device, wherein the resource configuration information is configured for the terminal device to send uplink data; and
sending, by the terminal device, the uplink data to the first access network device according to the resource configuration information.

12. The method of claim 11, wherein receiving, by the terminal device, the resource configuration information sent by the first access network device comprises:
receiving, by the terminal device, the resource configuration information carried in the downlink data or the PDCCH.

13. The method of claim 11, wherein the resource configuration information comprises at least one of a dedicated resource or an access sequence for the uplink data.

14. The method of claim 10, before receiving the downlink data sent by the first access network device, further comprising:
receiving, by the terminal device, a Radio Network Temporary Identity (RNTI) sent by the first access network device; and
demodulating, by the terminal device, the scheduling information according to the RNTI.

15. The method of claim 14, wherein receiving, by the terminal device, the RNTI sent by the first access network device comprises:
receiving, by the terminal device, system information sent by the first access network device, wherein the system information carries the RNTI.

16. The method of claim 10, further comprising:
receiving, by the terminal device, characteristic information of the first access network device, wherein receiving, by the terminal device, the PDCCH sent by the first access network device comprises:
receiving, by the terminal device, the PDCCH sent by the first access network device according to the characteristic information.

17. The method of claim 16, wherein receiving, by the terminal device, the characteristic information of the first access network device comprises:
receiving, by the terminal device, system information sent by the first access network device, wherein the system information carries the characteristic information of the first access network device.

18. The method of claim 16, wherein the characteristic information comprises at least one of time-domain resource information, frequency-domain resource information, subcarrier spacing information or subframe structure information.

19. The method of claim 10, wherein the downlink data is user-plane data or control-plane data.

20. A terminal device, comprising: a memory and a processor, the memory storing one or more computer programs that, when executed by the processor, cause the processor to execute operations comprising:
receiving a Physical Downlink Control Channel (PDCCH) sent by a first access network device, the PDCCH carrying scheduling information of downlink data of the terminal device, wherein the first access network device belongs to a set of access network devices, the set of access network devices comprise at least two access network devices and the terminal device is capable of moving without performing handover in coverage of the at least two access network devices, wherein each access network device in the set of access network devices stores context information of the terminal device and establishes a network connection with the terminal device in advance, such that the terminal device is capable of moving without performing handover in the coverage of the at least two access network devices; and receiving the downlink data sent by the first access network device according to the scheduling information.

\* \* \* \* \*